(12) United States Patent
Krasner

(10) Patent No.: US 6,289,041 B1
(45) Date of Patent: Sep. 11, 2001

(54) FAST ACQUISITION, HIGH SENSITIVITY GPS RECEIVER

(75) Inventor: Norman F. Krasner, San Carlos, CA (US)

(73) Assignee: SnapTrack, Inc., San Jose, CA (US)

( * ) Notice: Subject to any disclaimer, the term of this patent is extended or adjusted under 35 U.S.C. 154(b) by 0 days.

(21) Appl. No.: 09/021,854

(22) Filed: Feb. 11, 1998

Related U.S. Application Data

(60) Provisional application No. 60/037,904, filed on Feb. 11, 1997.

(51) Int. Cl.[7] .............................. A61F 2/06; H06L 27/30
(52) U.S. Cl. ........................................... 375/152; 375/343
(58) Field of Search .................................. 375/147, 152, 375/130, 143, 134, 137, 145, 340, 343–357, 335; 342/357; 370/335

(56) References Cited

U.S. PATENT DOCUMENTS

| 4,112,372 | 9/1978 | Holmes et al. . |
|---|---|---|
| 4,426,712 | 1/1984 | Gorski-Popiel . |
| 4,660,164 | 4/1987 | Leibowitz . |

(List continued on next page.)

FOREIGN PATENT DOCUMENTS

| 41 14 058 A1 | 11/1992 | (DE) . |
|---|---|---|
| 0 488 739 A1 | 6/1992 | (EP) . |
| 0 526 040 A2 | 2/1993 | (EP) . |
| 0 718 998 A2 | 6/1996 | (EP) . |
| 0 773 635 A2 | 5/1997 | (EP) . |
| 2 016 760 A | 9/1979 | (GB) . |
| 2 297 229 A | 7/1996 | (GB) . |
| WO 97/14057 | 4/1997 | (WO) . |
| WO 97/40398 | 10/1997 | (WO) . |
| WO 98/02830 | 1/1998 | (WO) . |

OTHER PUBLICATIONS

Written Opinion for PCT International Appln No. PCT/US98/07471, mailed May 15, 2000 (4 pgs).

Eric Holm & Edwin Westerfield, "A GPS Fast Acquisition Receiver," IEEE National Telesystem Conference, Nov. 14–16, 1983, pp. 214–218, XP–002100664.

PCT International Search Report for Int'l Appln No. PCT/US98/07471 mailed Aug. 31, 1999.

PCT International Search Report for Int'l Appln No. PCT/US98/11375 mailed Sep. 30, 1998.

J.J. Spilker, Jr. "Signal Structure and Theoretical Performance; Chapter 3: GPS Signal Structure and Theoretical Performance", *American Institute of Aeronautics and Astronautics, Inc.* 1994, pp. 57–83.

*Primary Examiner*—Stephen Chin
*Assistant Examiner*—Lenny Jiang
(74) *Attorney, Agent, or Firm*—Blakely, Sokoloff, Taylor & Zafman

(57) ABSTRACT

A method and apparatus of acquiring and tracking global positioning system signals with fast acquisition speed and high sensitivity is disclosed. A pseudo-random noise matching filter operation is performed on a sample of global positioning system signals to provide a current matched filter result. The current matched filter result is then accumulated with a prior matched filter result from a prior sample of global positioning system signals to produce an accumulated matched filter result. Efficient means for implementing the matched filter are disclosed.

38 Claims, 13 Drawing Sheets

U.S. PATENT DOCUMENTS

| | | | |
|---|---|---|---|
| 4,841,544 | 6/1989 | Nuytkens . | |
| 4,998,111 | 3/1991 | Ma et al. | 342/352 |
| 5,199,050 | 3/1993 | Linsky . | |
| 5,233,626 | 8/1993 | Ames . | |
| 5,237,587 | 8/1993 | Schoolcraft . | |
| 5,373,531 | 12/1994 | Kawasaki . | |
| 5,414,728 | 5/1995 | Zehavi . | |
| 5,548,583 | 8/1996 | Bustamante . | |
| 5,557,641 * | 9/1996 | Weinberg | 375/295 |
| 5,572,216 * | 11/1996 | Weinberg et al. | 342/357 |
| 5,576,715 | 11/1996 | Litton et al. | 342/357 |
| 5,579,014 | 11/1996 | Brooksby et al. | 342/357 |
| 5,579,338 | 11/1996 | Kojima . | |
| 5,589,833 | 12/1996 | Randall et al. | 342/195 |
| 5,600,328 | 2/1997 | Tachita et al. | 342/357 |
| 5,640,416 | 6/1997 | Chalmers . | |
| 5,663,983 | 9/1997 | Lin . | |
| 5,736,961 | 4/1998 | Fenton et al. | 342/357 |
| 5,799,010 * | 8/1998 | Lomp et al. | 370/335 |
| 5,809,064 | 9/1998 | Fenton et al. . | |
| 5,822,363 | 10/1998 | LeRoy . | |
| 5,955,986 * | 9/1999 | Sullivan | 342/357.05 |
| 5,991,308 * | 11/1999 | Fuhrmann et al. | 370/474 |

* cited by examiner

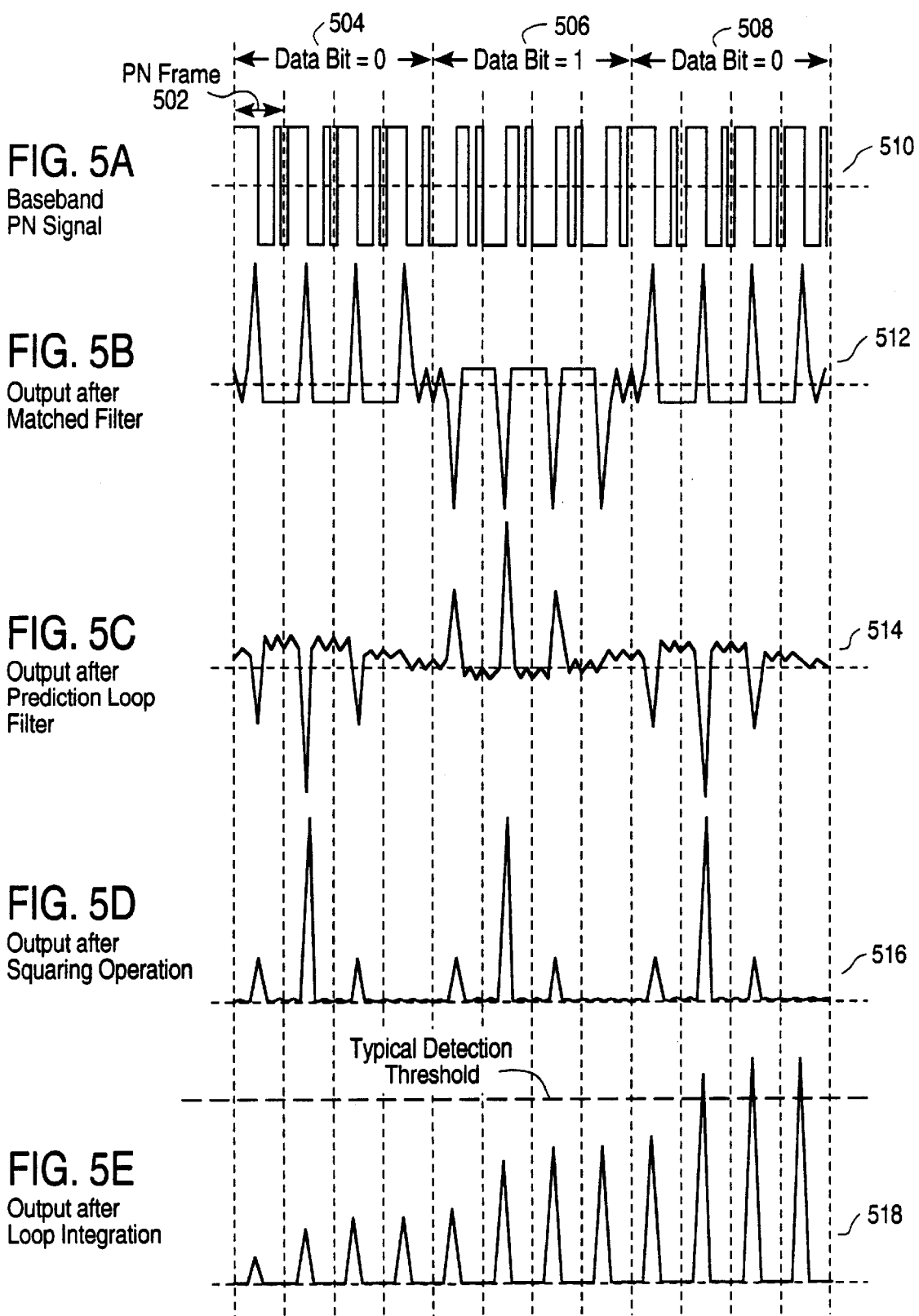

FAST ACQUISITION, HIGH SENSITIVITY GPS RECEIVER

CROSS REFERENCES TO RELATED APPLICATIONS

The application is a continuation-in-part of Provisional U.S. Patent Application No. 60/037,904, entitled "Fast Acquisition, High Sensitivity GPS Receiver", filed on Feb. 11, 1997 by the same inventor, Norman F. Krasner, and assigned to the assignee of the present invention.

FIELD OF THE INVENTION

The present invention relates generally to the field of global positioning systems, and more particularly to receiving and tracking satellite signals in an integrated fast acquisition, high sensitivity receiver.

BACKGROUND OF THE INVENTION

Most conventional Global Positioning System (GPS) receivers utilize serial correlators in order to acquire, track, and demodulate signals transmitted from Navstar satellites. Each transmitted GPS signal is a direct sequence spread spectrum signal. The signal available for commercial use is that associated with Standard Positioning Service (SPS) and utilizes a direct sequence biphase spreading signal with a 1.023 Mchip per second spread rate placed upon a carrier at 1575.42 MHz. The Pseudo-random Noise (PN) sequence length is 1023 chips, corresponding to 1 msec time period. Each satellite transmits a different PN code (Gold code) which allows the signals to be simultaneously transmitted from several satellites and to be simultaneously received by a receiver, with little interference from one another. In addition, data superimposed on each signal is 50 baud binary phase shift keyed (BPSK) data with bit boundaries aligned with the beginning of a PN frame; 20 PN frames occur over 1 data bit period (20 msec).

A primary goal of a GPS receiver is to determine the time-of-arrival of the PN codes. This is accomplished by comparing (for each received signal) a locally generated PN reference against the received signal and "sliding" the local reference in time until it is time-aligned with the received signal. The two signals are compared with one another by a multiplication and integration process known as a correlation process. When the two signals are time aligned a large output results. Typical serial correlators used in standard GPS receivers compare the local and received signals one time offset at a given time. If such a comparison is done every half-chip interval, there are 2046 comparisons (or tests) required to completely search over one PN epoch. Such a search must be done for several of the satellites in view. In addition, errors in received signal frequency often require additional searches to be made for various hypotheses of signal frequency. The time to perform this search may be very lengthy, especially under low input signal-to-noise ratio situations. Conventional GPS receivers utilize a multiplicity of such correlators operating in parallel to speed up the acquisition process. Nevertheless, the search and acquisition process is very time consuming, especially in low received signal-to-noise situations.

It is therefore desirable to provide a hardware architecture that improves the acquisition speed and sensitivity of current conventional GPS receivers. Such an architecture would allow the receiver to operate at a very low input signal-to-noise ratio. It is further desirable to integrate a method for tracking such signals, following the acquisition procedure, in which a commonality of hardware is used for both the acquisition and tracking of received GPS signals.

SUMMARY OF THE INVENTION

The present invention discloses a method and apparatus for acquiring and tracking global positioning system signals with a fast acquisition speed and high sensitivity. In a method of the present invention, a first pseudo-random noise matching filter operation is performed on a current sample of global positioning system signals to provide a current matched filter result. The current matched filter result is then accumulated with a prior matched filter result from a prior sample of global positioning system signals to produce an accumulated matched filter result.

In one embodiment of the present invention, a matched filter and detection circuit are combined with a pre-detection loop integrator and a post-detection loop integrator. The loop integrators allow the acquisition and tracking of multiple frames of data comprising the received global positioning system signal. This results in a combination of rapid acquisition performance and high sensitivity. Efficient means for implementing the matched filter are disclosed.

Other features of the present invention will be apparent from the accompanying drawings and from the detailed description which follows.

BRIEF DESCRIPTION OF THE DRAWINGS

The present invention is illustrated by way of example and not by way of limitation in the figures of the accompanying drawings in which references indicate similar elements and in which:

FIG. 5 illustrates waveforms for a signal at various processing stages of the acquisition circuit of FIG. 4.

DETAILED DESCRIPTION

A method and apparatus for receiving global positioning system signals through a fast acquisition, high sensitivity receiver is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form to facilitate explanation.

Figure 1:
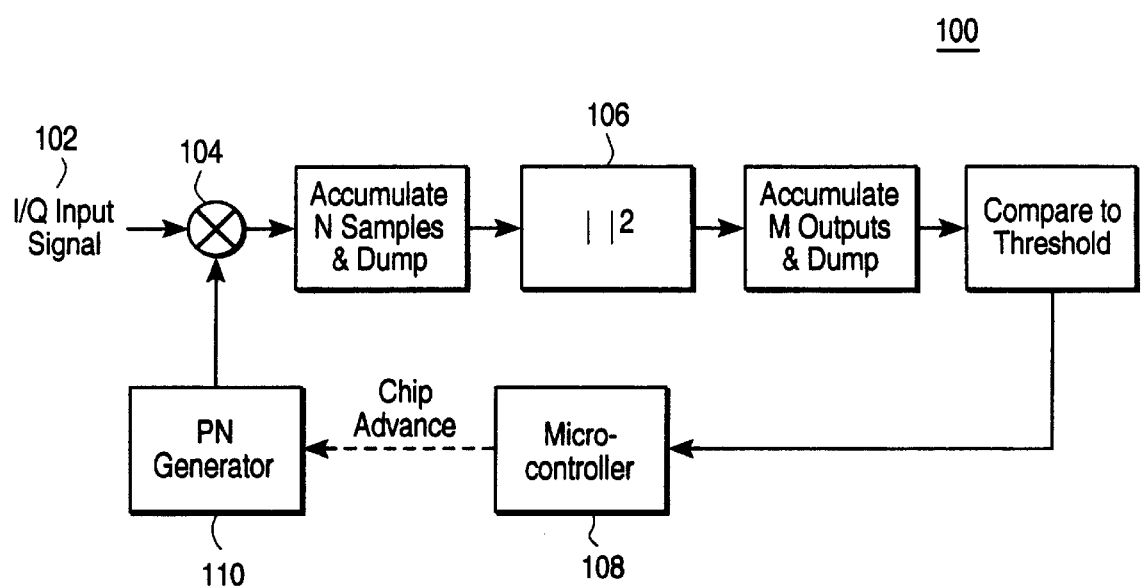
FIG. 1 is a block diagram representation of a prior art global positioning system correlator circuit.

Global Positioning System (GPS) receivers receive GPS signals transmitted from orbiting GPS satellites and determine the time-of-arrival of appropriate codes by comparing the time shift between the received signal and an internally generated signal. The signal comparison is performed in a correlation process which entails multiplying and integrating the received and generated signals. A typical prior art serial correlator circuit utilized in common GPS receivers is illustrated in FIG. 1. The correlator 100 receives an input GPS signal 102 and combines, in multiplier 104, the received signal 102 with an internally generated PN code produced by a PN generator 110. A magnitude squaring (or other detection) operation 106 is then performed on an accumulated set of samples of the combined signal. A micro-controller 108 controls the sequencing of PN chips generated by PN generator 110. According to the system of correlator 100, the received signal 102 is compared to a long sequence of PN chips one time offset at a time, thus requiring a very long period of time to search over all offsets corresponding to one PN frame.

Acquisition Circuit

Figure 2:
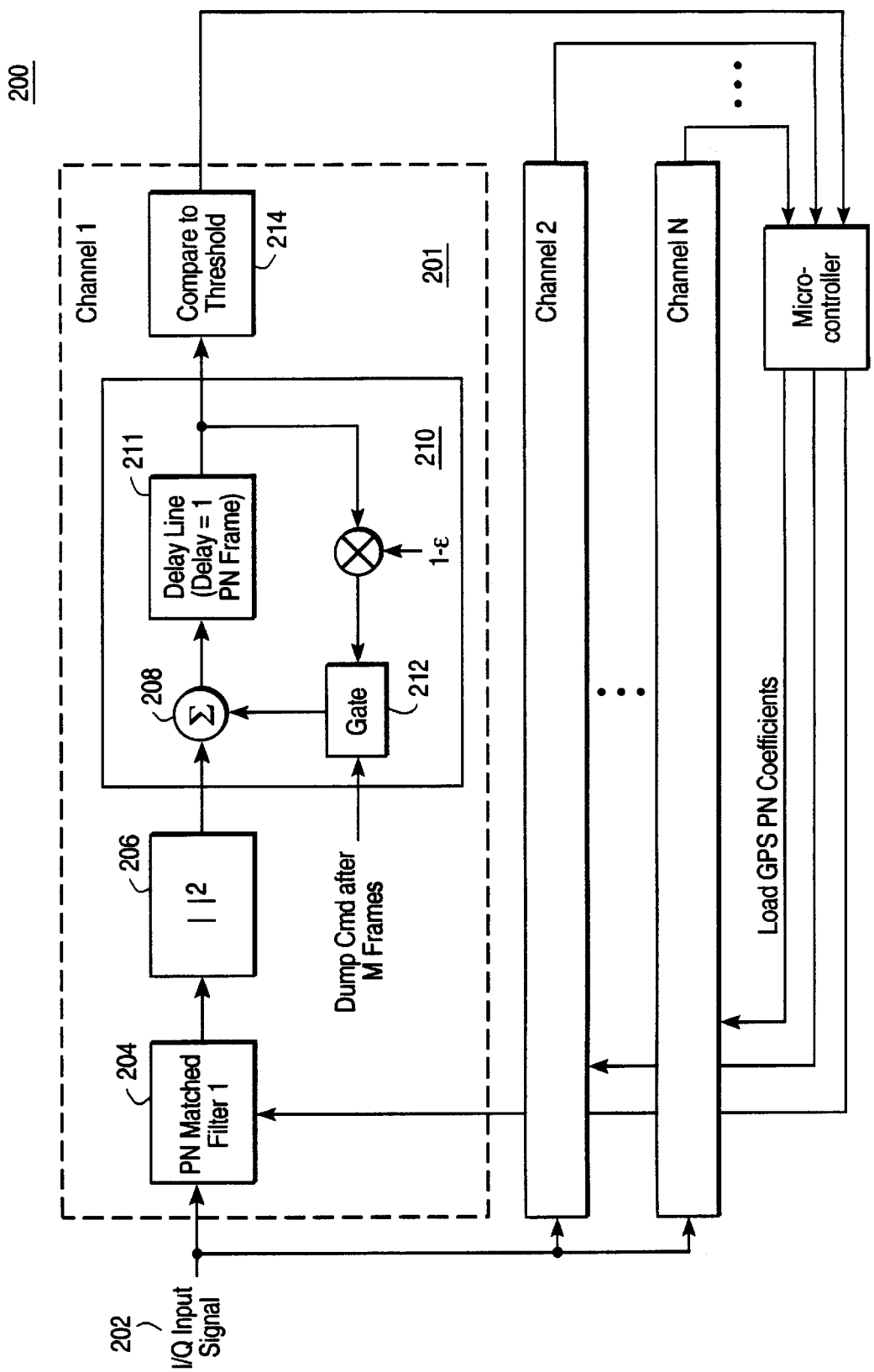
FIG. 2 is a block diagram representation of a global positioning system acquisition circuit according to one embodiment of the present invention.

An improved acquisition circuit for use in GPS receivers, according to one embodiment of the present invention, utilizes one or more matched filters together with pre-processing and post-processing functions to achieve rapid acquisition of GPS signals and high sensitivity. In particular, a post-matched filter loop integrator (also called a "comb filter") provides the integration necessary to achieve very high sensitivity which allows the receiver to operate in low signal-to-noise ratio environments. FIG. 2 illustrates an GPS input signal acquisition circuit 200 comprising separate acquisition circuits for multiple input channels. A block diagram representation of an acquisition circuit for a single channel 201 of the GPS acquisition circuit is illustrated according to one aspect of the present invention.

The input baseband signal 202 is fed in parallel to several matched filters 204 within the acquisition circuit 200. Input baseband signal 202 is composed of separate in-phase (I) and quadrature (Q) components. The taps of each of the filters within each channel are arranged to be sampled representations of the same or different PN transmitted waveforms flipped in time. Normally, the input sample rate is a multiple of the chip rate and hence there are typically 1023 M taps of the matched filter, where M is a small integer, typically 2. If the input signal contains a transmitted waveform matched to a given matched filter, its output will contain a narrow spike of width approximately one chip duration. One spike will occur for each frame period and provides time-of-arrival information, modulo one PN frame period. Since the signal is quadrature represented, the spike will actually be a complex number. Its polarity reverses in phase at the data baud boundaries in accordance with the transmitted data stream. In addition, the phase angle may be slowly advancing or retarding in time due to small frequency differences between the received signal carrier frequency and the locally generated frequency.

When the signal is very weak, e.g., due to blockage by objects such as trees or buildings, each of these spikes may be obscured by noise and hence are not directly usable for time-of-arrival measurement. To build up the energy of the spikes, the output of the matched filter may be detected via a square-law or other detection operation 206, in order to remove the varying phase angles just mentioned. The energy from one PN frame is then added to that of the previous frame through delay line integrator 210. For a delay of one PN frame, a spike from a previous frame will be delayed by exactly one PN frame, and hence this energy will exit the delay line 211 just as the spike from the next frame is about to enter delay line 211. The two spikes are then added together by the summing circuit 208 to produce a stronger spike. The random portions of noise will be incoherently added (a DC level will be increased) and hence will only grow as the square-root of the number of frames so summed. The DC level associated with the noise may be determined through an averaging process at the integrator output and subtracted from this final output. This eases the determination of an appropriate detection threshold.

As illustrated in FIG. 2, the feedback from the loop integrator 210 is not unity, but is instead $1-\epsilon$, where $\epsilon$ is a number small compared to unity. The loop integrator 210 thus effectively acts as a "leaky" summing circuit, which in effect averages, in a running sense, a number of frames roughly equal to $1/\epsilon$. In an alternative embodiment of the present invention, a loop integrator 210 with a feedback of unity followed by a delay and subtract circuit, may be used. In this case the delay will be set equal to $MT_f$. This implements a "boxcar" type filter, which directly adds together the last M frames. The storage necessary to accommodate M frames of data is severe.

In yet another embodiment of acquisition circuit 200, loop integrator 210 utilizes a feedback of unity and repetitively sums M frames of data by gating out the feedback through gate 212 after every M frames. In this fashion, the output of the loop integrator will have a valid output (i.e. one representative of M frames of data) only on every Mth frame. In many instances this update frequency is acceptable for acquisition.

The delay line circuit 211 within loop integrator 210 of acquisition circuit 200 may be implemented using shift registers to delay the propagation of a signal through the circuit. Alternatively, random access memory (either single or dual port) devices, instead of shift registers may be used. In this case, the memory will be loaded and accessed in a manner which emulates the operation of shift registers in the loop integration function.

Figure 3:
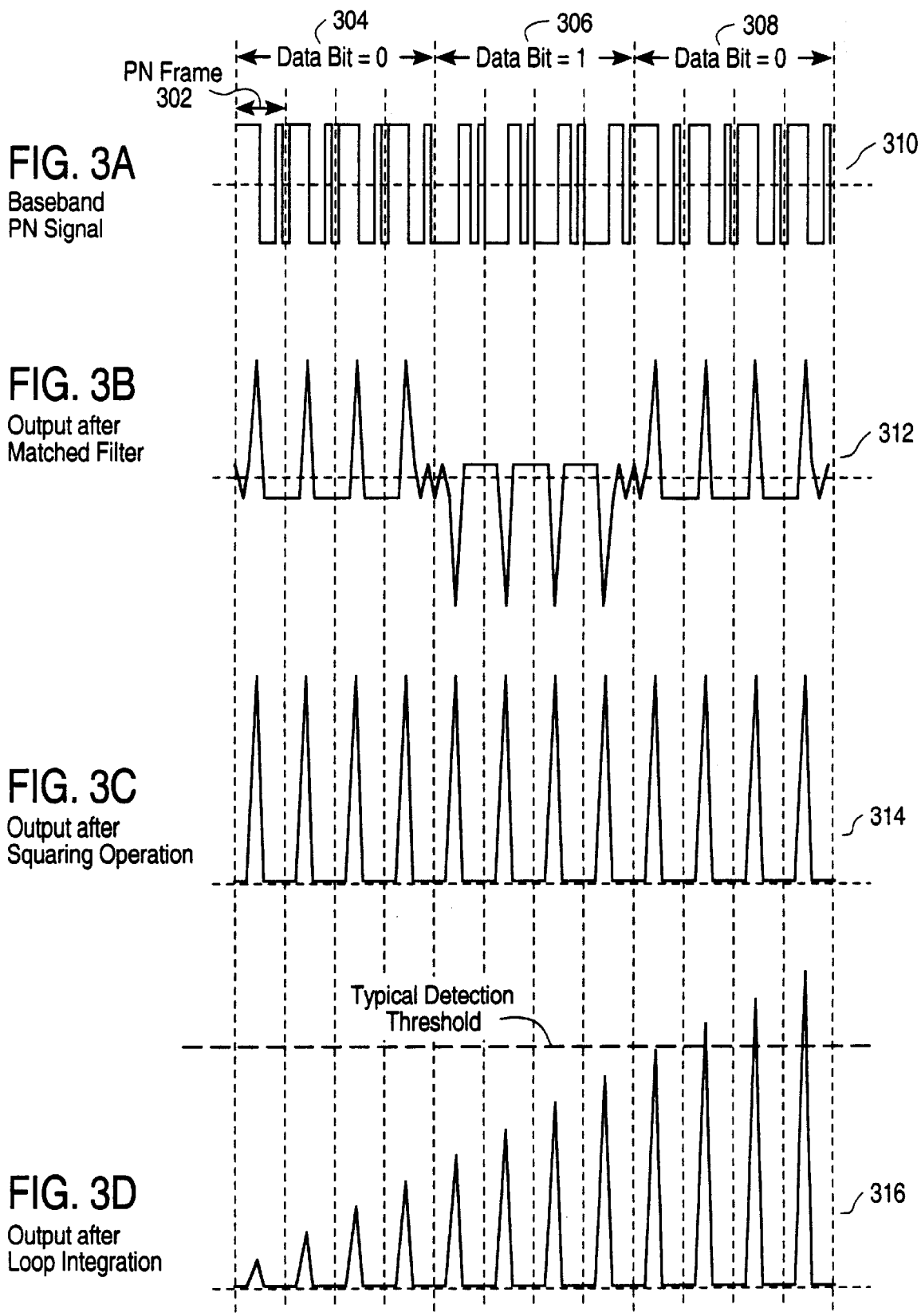
FIG. 3 illustrates waveforms for a signal at various processing stages of the acquisition circuit of FIG. 2.

FIG. 3 illustrates signal waveforms at various processing points within a single acquisition circuit 201 in acquisition circuit 200. For purposes of illustration, FIG. 3 illustrates a simplified PN signal having only seven chips per PN frame, instead of 1023 as in a normal GPS signal. The range of the waveforms in FIG. 3 extend for three data bits 304, 306, 308 with four PN frames 302 per bit. For simplicity, no noise is illustrated and only the signals for the in-phase channel are illustrated. It is also assumed that the loop filter 210 uses unity feedback.

The base-band PN signal 310 waveform illustrates a representative I/Q input signal 202 input to the acquisition circuit 200 (only I or Q shown). The output after matched filter waveform 312 illustrates the signal waveform after the I/Q input signal 202 has been processed by matched filter 204. From matched filter 204, the signal is propagated to a magnitude squaring circuit 206 which produces the output after squaring waveform 314. From the magnitude squaring circuit 206, the signal is propagated to the loop integrator 210 which produces the output after loop integration waveform 316. The output after loop integration waveform 316 illustrates the increase in signal peak amplitude with time due to operation of the square-law detector and iterative propagation through the loop integrator 210. FIG. 3 also illustrates a detection threshold level superimposed upon the output after loop integration waveform 316. The detection threshold level represents the threshold signal level set by threshold comparator 214 in acquisition circuit 200.

Although the baseline of the signal also grows with time, its DC component is easily removed by averaging the output. Since the width of the peak is small with respect to the total frame period, the effects of this peak on the average is small for the actual GPS signals. It should be noted that the locations of the peaks provide the time-of-arrival of the received GPS signal modulo one frame period. It should be further noted that the amplitude scales for the waveforms of FIG. 3 are not necessarily scaled in reference to one another.

Figure 4:
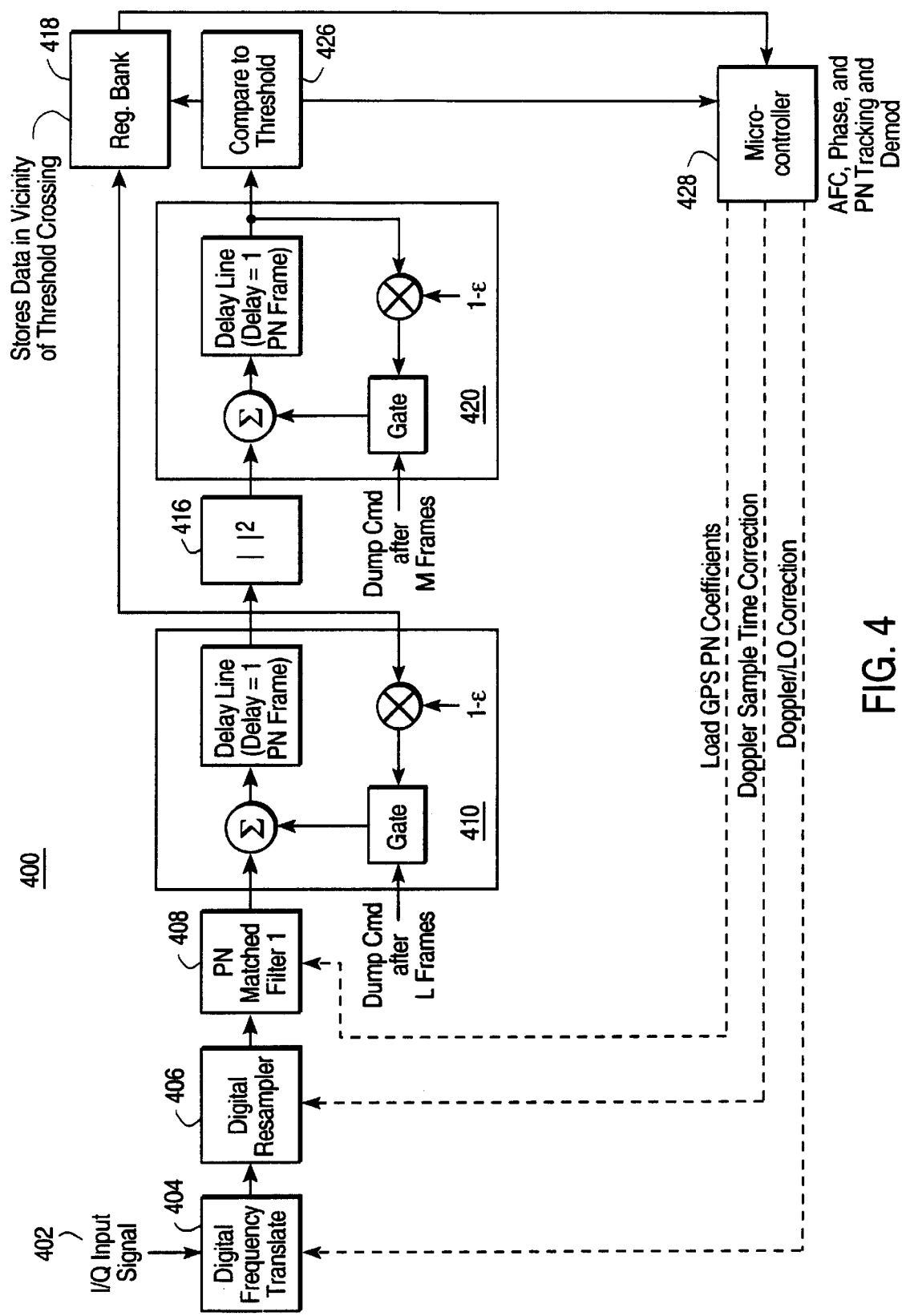
FIG. 4 is a block diagram representation of a global positioning system acquisition circuit which also performs tracking functions, according to an alternative embodiment of the present invention.

An alternative embodiment of a single channel GPS acquisition according to the present invention is illustrated in FIG. 4. The acquisition circuit 400 of FIG. 4 is a single channel acquisition similar to that of FIG. 2, but which contains additional processing elements. These additional elements include digital frequency translation circuit 404, compensating for Doppler and LO frequency offsets, digital resampler 406 which compensates for Doppler and LO sampling rate offsets, and predetection loop filter 410.

With reference to FIG. 4, the process of signal tracking and data demodulation according to one aspect of the present invention will be described. The digital frequency translation 404 circuit simply multiplies the I/Q input signal 402 by an exponential of the form $\exp(-j2\pi n f_d T_s)$, where $f_d$ is the combined Doppler and LO frequency offset, $T_s$ is the sample period and n is the running time index. This compensation is required so that the residual signal frequency error is much less than the PN frame rate (1 kHz). Otherwise, the effect of frequency offset would be to reduce the amplitude of the matched filter 408 output signal by a quantity equal to $|\sin(\pi f_d T_f)/\pi f_d T_s|$. For example, if $f_d=1/T_s$, then the amplitude of the signal out of the matched filter would be zero.

The Doppler sample rate correction signal 430 is input to the digital resampler 406, which corrects small errors that result from the received I/Q input signal 402 "stretching" or "contracting" in time, as a result of Doppler shift. For example a Doppler error of 2 $\mu$sec/sec (which is well within the observed Doppler of GPS satellites) represents a times shift of two chips over a period of 1 second. Such a time shift will limit the number of loop integrations that can be performed since the detection spikes at later time periods will not line up with those at earlier time periods, and hence processing gain will level out (or actually be reduced) in relation to increased integration time. In addition, the correlation peak out of the loop integrator will broaden, contributing to errors in measured time-of-arrival (or "pseudorange").

Digital resampler circuit 406 utilizes data provided to acquisition circuit 400 in order to compute new data samples that lie between the original sample points, at sampling instances in accordance with those provided by the specified sample rate correction. For example, if the sample rate provided to circuit 400 were 2 samples per chip and the desired sample rate were 2−δ samples per chip, the new sample interval would then be equal to $T_c/(2-\delta)$ and hence the new samples would be taken at positions after the corresponding times of the original data. Eventually, the slippage would equal $T_c/2$, i.e., one complete sample period. This is expeditiously handled by dropping one sample clock from circuit 400. Digital resampling is done through a process called digital fractional interpolation. In its simplest form, several samples about the position of the new sample time of interest are supplied to an appropriate interpolation algorithm, such as a polynomial or spline fit, for computing the signal value at the appropriate time.

In an alternative embodiment of circuit 400, the digital resampler 406 is omitted and replaced with a process which constantly reloads the matched filter with new coefficients that effectively include a small added delay over time. Thus, the digital resampler 406 may be replaced by updating the filter weights of the matched filter in a manner to effect a delay operation on these filter weights. This method requires filter coefficients of size more than one bit each for precise implementation, and hence adds complexity to the circuit. However, moving coefficients of the matched filter one position left or right is an alternative to dropping or adding a sample.

The acquisition circuit 400 includes two loop integrator circuits. A predetection loop integrator circuit 410 is utilized prior to the detection operation 416, and the postdetection loop integrator circuit 420 is utilized after the detection operation 416. The dual loop integrator circuit takes advantage of the fact that the data period equals 20 PN frames. Hence, the PN signal repeats many times, before data present inverts the polarity of the signal. Thus, if the Doppler correction is good, one can coherently add together PN frames either prior to, or after performing the matched filter operation. Clearly only a maximum of 20 such frames could be added before the data polarity inversion causes deteriorating performance. Such coherent addition provides improved sensitivity in lieu of incoherent (postdetection) integration, since coherent integration builds up the signal-to-noise ratio at he position of the spike, prior to performing the square-law operation 416.

FIG. 5 illustrates signal waveforms at various processing points within a circuit 400. For purposes of illustration, FIG. 4 illustrates a simplified PN signal having only seven chips per PN frame, instead of 1023 as in a normal GPS signal. The range of the waveforms in FIG. 4 extend for three data bits 504, 506, 508 with four PN frames 502 per bit. For simplicity, no noise is illustrated and only the signals for the in-phase channel are illustrated. It is also assumed that the predetection loop filter 410 and postdetection loop filter 420 both use unity feedback. The predetection loop filter 410 is assumed to accumulate the last four frames in a running sense.

The baseband PN signal 510 waveform illustrates a representative I/Q input signal 402 input to the acquisition circuit 400. The output after matched filter waveform 512 illustrates the signal waveform after the I/Q input signal 402 has been processed by matched filter 408. From matched filter 408, the signal is propagated through the predetection loop filter 410 which produces the output after predetection loop filter waveform 514. The signal is then input to the squaring circuit 416 which produces the output after squaring operation waveform 516. From the squaring circuit 416, the signal is propagated to the postdetection loop integrator 420 which produces the output after loop integration waveform 518. The output after loop integration waveform 518 illustrates the increase in signal peak amplitude with time due to operation of the square-law detector and iterative propagation through the loop integrator 420. FIG. 5 also illustrates a detection threshold level superimposed upon the output after loop integration waveform 518. The detection threshold level represents the threshold signal level set by threshold comparator 426 in acquisition circuit 400. It should be noted that the peaks of the output after loop integration waveform 518 do not increase linearly, as they do for the single loop integration circuit 200, as illustrated in FIG. 3. However, the amplitude of every fourth peak, corresponding to the predetection filter memory, does increase nearly linearly. As with FIG. 3, it should be further noted that the amplitude scales for the waveforms of FIG. 5 are not necessarily scaled in reference one another.

An analysis of the input versus output signal-to-noise ratio for various parameters related to the operation of acquisition circuit 400 leads to the following equation:

$$(S/N)_{out} = L(S/N)_i^2 \times F \times \text{npostd} \times \text{npred}/(1/(F \text{ npred}) + 2(S/N)_i)$$

In the above equation, the variables have the following values:

$L = L_{dopp} \times L_{data}$ $L_{dopp} = \text{sinc}^2(\text{freq\_offset} \times \text{npred} \times 0.001)$ $L_{data} = (1 - 0.315 \times \text{npred}/20)^2$ In the above equation, the variables have the following meanings:

| | |
|---|---|
| npred: | Number of predetection frames summed |
| npostd: | Number of independent postdetection frames summed= total number frames/npred |
| F: | Number of independent samples per PN frame, taken to be 1023 |
| $L_{dopp}$: | Loss due to an error in Doppler |
| $L_{data}$: | Loss due to data transitions degrading coherent integration |
| freq\_offset: | Carrier frequency error between received signal and receiver's estimate (including local oscillator and Doppler errors) |

In the above equation, $(S/N)_{Out}$ is the peak output signal power divided by the mean-square background noise power; and $(S/N)_{in}$ is the average signal power divided by the average noise power measured in a bandwidth equal to the chip rate (approximately 1 MHz). Note that (npred×npostd) equals the total number of PN frames integrated. The above equation can then be used to select the parameters npostd and npred (M and L in FIG. 4) in order to achieve maximum output SNR (which normally should exceed about 15 dB, or a factor of about 30 for good detection probability and low false detection rates). In some cases when the Doppler error may be large one can slowly step, or tune the Doppler control lines, output from microcontroller 428, until a detection occurs.

Acquisition circuit 400 of FIG. 4 also contains register bank 418. Register bank 418 is a circuit element which can receive data from either the postdetection loop integrator 420 or the predetection loop integrator 410. Postdetection data from postdetection loop integrator 420 corresponds to the acquisition mode. During signal tracking and demodulation, the GPS receiver must track carrier frequency and phase, as well as PN code phase, and demodulate the 50 baud data message. This can all be done by using the I and Q samples out of the matched filter at, and in the vicinity of, the signal peak. In this case, the predetection loop integrator 410 effectively coherently adds approximately 10 frames of data (i.e. one-half bit period) and send the results at, and nearby the peak, to the register bank. That is, a typical update rate is 100 updates per second. A microprocessor would read these results and implement carrier, code, and bit tracking loops in software and send control signals (e.g., from microcontroller 428) to maintain proper tracking. The design of such tracking loops is well known to those of ordinary skill in the art. Note that it is possible to use only one loop integrator, instead of the two illustrated in FIG. 4. A single loop integrator would serve the purpose of either acquisition or tracking. However, in this situation there would be no predetection integration during acquisition and no postdetection integration during tracking. The microprocessor, however, could perform postdetection integration during tracking.

Matched Filter

Figure 6A:
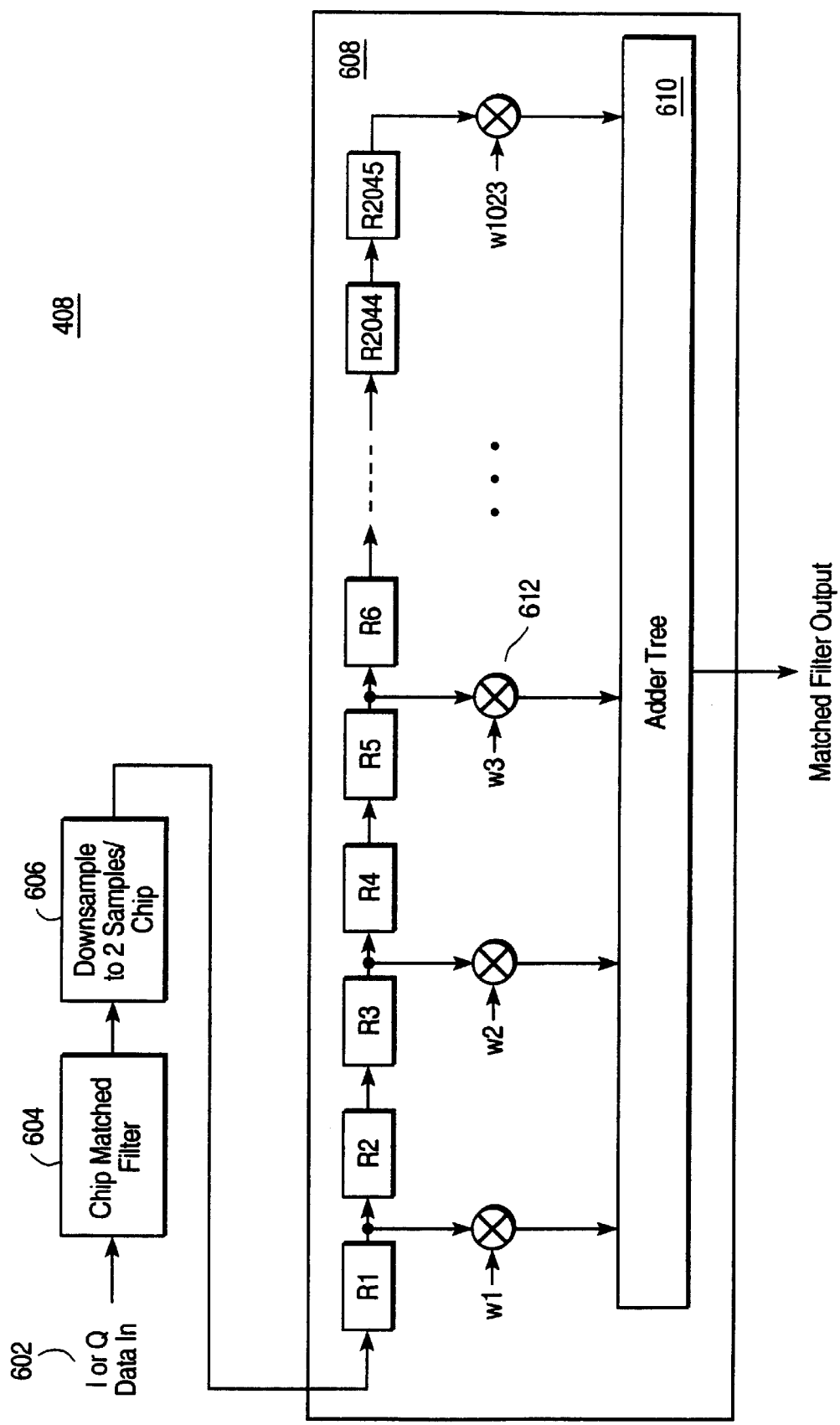
FIG. 6A is a block diagram representation of a matched filter utilized by acquisition circuit of FIG. 4, according to one embodiment of the present invention.

FIG. 6A presents a detailed representation of matched filter 408 in acquisition circuit 400, according to one embodiment of the present invention. Matched filter 408 utilizes a weighted tapped delay line structure. Filter 408 is divided into two separate sections. One section contains a chip matched filter 604 that is matched to the time waveform of an individual chip. Chip matched filter 604 is followed by a tapped filter 608 which is matched to the actual pattern of the pseudorandom signal pattern. By breaking up the filter in this manner, the tapped filter contains taps which assume only values of ±1 and, furthermore, every other tap may be set to zero. In the matched filter exemplified in FIG. 6A, it is assumed that a sample rate provided to tapped filter 608 is two samples per chip, as generated by downsampler 606.

Figure 7:
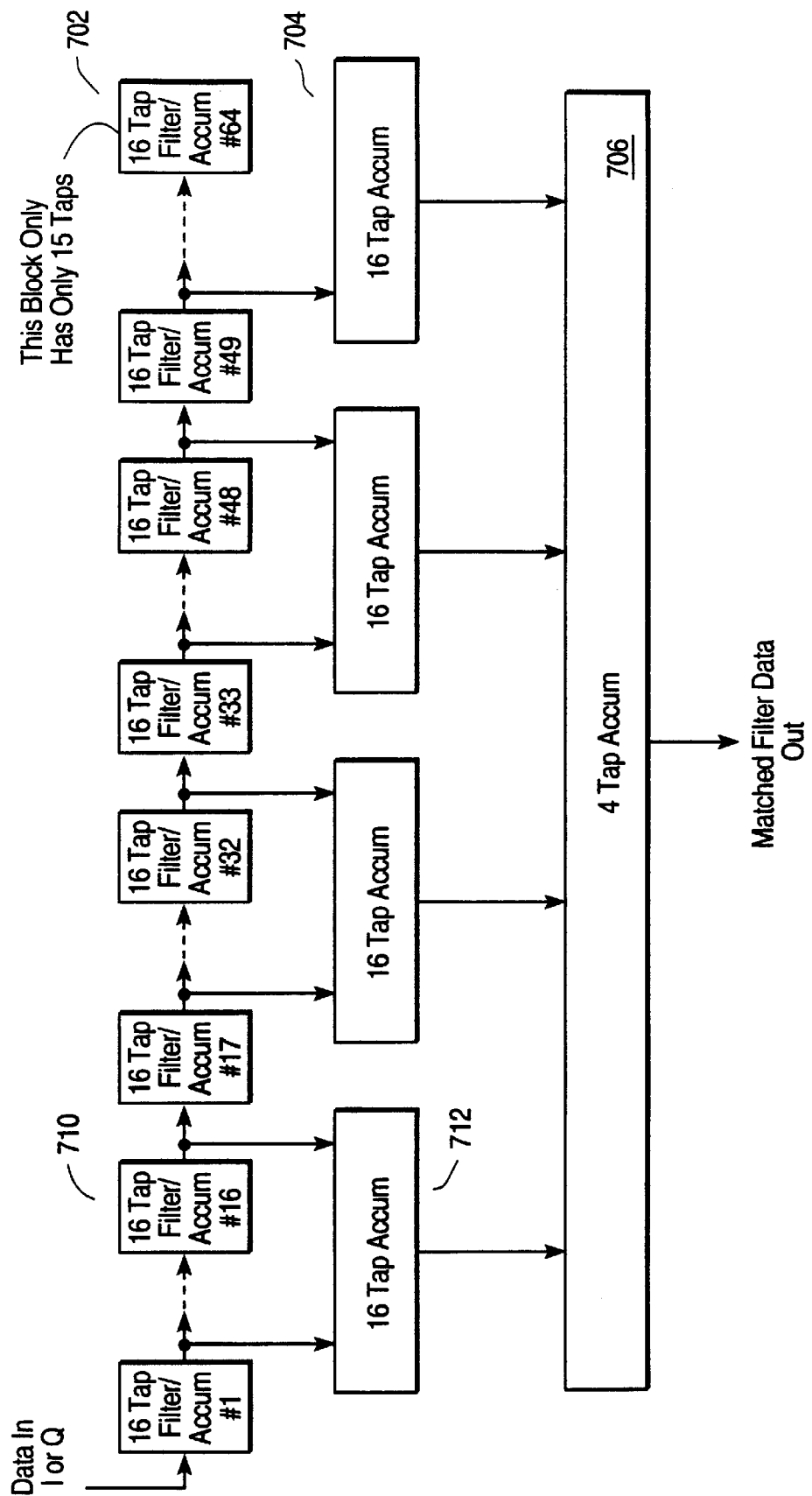
FIG. 7 is an alternative representation of the most complex portion of the matched filter of FIG. 6A, according to one embodiment of the present invention.
Figure 8:
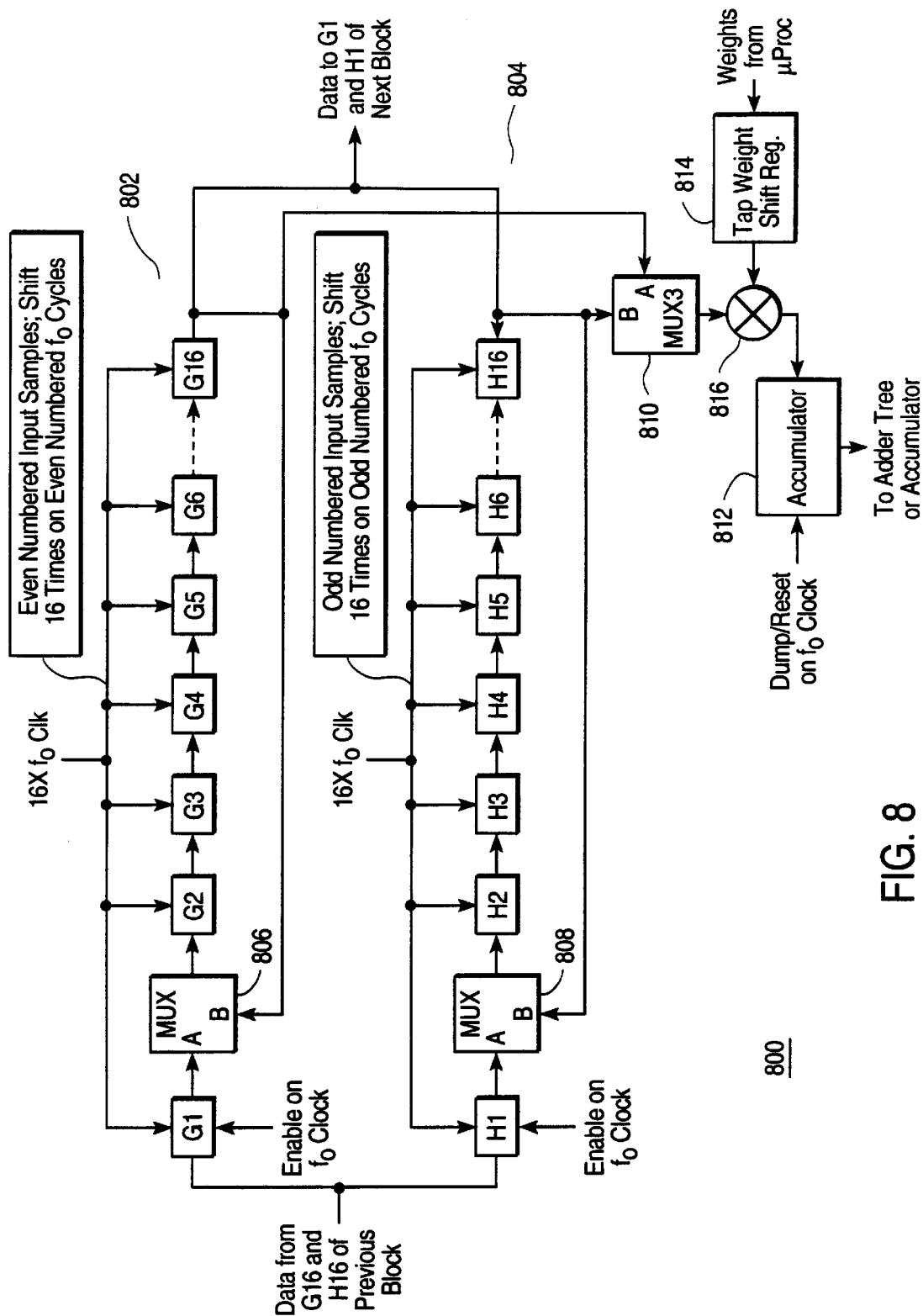
FIG. 8 is more detailed representation of certain constituent elements of the matched filter of FIG. 7, according to an alternative embodiment of the present invention.

Tapped filter 608 also includes adder tree 610 and multipliers 612. In the system of FIG. 6A, adder tree 610 requires approximately 512 adders to complete the summation. In this example, the sizes of the adders range from q to q+10 bits, with q being the input quantization (typically 2 to 4 bits I and Q). The resulting complexity can be greatly reduced by utilizing a set of high speed accumulators to sum successive sets of the outputs from the multipliers 612. For example, one accumulator might sum the outputs of multipliers w1 through w16, and a second could sum the outputs from multipliers w17 to 32, etc. This is illustrated in FIGS. 7 and 8. A straightforward approach using an accumulator would employ a 16:1 multiplexer, whose inputs are connected to each of the registers G1 through G16 (shown in FIG. 8), to select in turn the outputs of these registers and accumulate them. In some cases, this may result in a large gate count.

FIG. 7 illustrates tapped filter 608 utilizing a series of 16-tap filter/accumulators 710 to provide the weighting and summation for successive groups of 16 taps. Similar structures 706 and 712 perform the additions of the outputs of these elements 710.

FIG. 8 illustrates further detail of the filter/accumulator 710. The circuit of FIG. 8 utilizes a series of sub-blocks, each containing two shift registers 802, 804 arranged in two loops to provide data to the weight multiplier and accumulator. Sub-block 802 contains multiplexer 806, and sub-block 804 contains multiplexer 808. This arrangement avoids the requirement to have a set of 16:1 multiplexers to select the data, which in some implementations results in a very gate intensive system. During one 2.046 MHz clock cycle the shift register is right shifted once and circularly shifted 15 times so that the filtering operation corresponding to 16 registers worth of data is completed using a clock at rate 16 times this master clock. The shift registers comprising sub-block 802 and sub-block 804 correspond to the even and odd numbered data samples. The upper half, sub-block 802, are processed during one 2.046 MHz cycle and the lower, sub-block 804, are processed during the next 2.046 MHz cycle. This dual block structure takes advantage of the fact that only half the registers in tap register 608 are connected to the adder tree 610 at any one time.

Operation of the two shift registers of within circuit 800 is as follows. On an even 2 MHz $f_o$ clock boundary, multiplexer 806 is in 'A' position and multiplexer 810 is in 'A' position; register G16 is multiplied by tap weight 814 and stored in accumulator 812, and all 'G' registers shift right. Data from register G16 is fed to register G1 of the next block. Multiplexer 806 is then placed in 'B' position and data in the top set 802 of registers, G2 to G16, are circularly shifted, multiplied by tap weights 814, and accumulated in accumulator 812. On an odd 2 MHz $f_o$ clock boundary, multiplexer 808 is in 'A' position and multiplexer 810 is in 'B' position; register H16 is multiplied by tap weight 814 and stored in accumulator 812, and all 'H' registers shift right. Data from register H16 is fed to register H1 of the next block (not shown). Multiplexer 808 is then placed in 'B' position and data in the bottom set 804 of registers H2 to H16 are circularly shifted, multiplied by tap weights 814, and accumulated in accumulator 812. The process then repeats.

The weight values for the taps are shifted in through shift register 814. As the weight values are shifted in, they are combined, in multiplier 816, with the output from multiplexer 810 prior to input to accumulator 812. The weight values are +/−1, so multiplier 816 acts as a selectable inverter. This shift register is 32 stages long. It shifts 16 times per $f_o$ clock cycle.

With reference to FIG. 7, it is assumed that the input rate to the filter is approximately 2.046 MHz. With this input rate, the accumulation rate is approximately 32.736 MHz, which is well within the capability of low cost integrated circuit technology. Thus, the main processing of the tap filter 608, shown as the top row of blocks 702 in FIG. 7 (labeled "16 tap filter/accum") would be performed by 64 such accumulators, each of size q+4 bits. For q=4, this corresponds to approximately 512 full adders, which is equivalent in complexity to two 16×16 multipliers (not including the registers that are part of the accumulator). Thus, one I and one Q matched filter channel would have a gate complexity of approximately four 16×16 multipliers plus a number of storage bits of size about 17500 (for 4 bit I and Q quantization). This number would then be multiplied by the number of matched filter channels utilized. Of course, if the accumulators are run at a higher rate, the number of gates required can be further reduced.

The outputs of the 64 accumulators 702 in FIG. 7 for the above example are dumped at the rate of 2.046 MHz. These signals can be placed in a set of 64 registers, again organized as four sets of 16 registers. These operations are performed by the blocks 712. Since the dump rate is 32.736 MHz, the outputs of each group of 16 registers can be accumulated by a structure similar to FIG. 8 (with tap weights set to unity). Four such accumulators would be required. Following this could be a four tap accumulator 706 which would be similar to the 16 tap accumulators, but using a clock rate of one-fourth of those devices, and having shift registers of length 4 instead of 16. Thus, it should be noted that the hardware required to complete the summation is only about 10% greater than that required to perform the initial set of 64 filter/accumulation operations. Note that only one chip level matched filter 604 need be used to service all such PN level matched filters.

In an alternative embodiment of the present invention, the matched filter may be implemented by a circuit which implements a fast Fourier transform (FFT) algorithm. In this case, the tapped delay line filter 408 of acquisition circuit 400 will perform FFT operations for fast convolutions. With reference to FIG. 6A, in which it is to be understood that an FFT circuit replaces the tapped delay line filter 608, a FFT operation is performed on the signal data 602 and on the weight vectors 612. The two are then multiplied together and the result is inversely transformed to compute the circular convolution, as is well understood by those skilled in the art. This series of operations may be performed for each PN frame and the resulting data may be accumulated and detected by elements 410, 416, and 420.

Instead of circular convolution, an alternative approach is to implement "overlap add" or "overlap save" operations. These operations are known to those skilled in the art, and avoid the circular convolution at the expense of more complex processing. However, this alternative approach may result in improved performance. Other fast convolution methods also exist in the Art. For example, those discussed in "Fast Fourier Transforms and Convolution Algorithms," by H. J. Nussbaumer, New York, Springer-Verlag, 1982 may also be utilized in substitution for the filter implementation of this invention.

In yet another alternative embodiment of the present invention, the matched filter 408 of acquisition circuit 400 may be interchanged with the coherent integration operation of loop 410. Both the matched filter operation and the coherent integration operation are linear time invariant filtering functions, and it is well known that such an interchange results in an identical output of the composite function, assuming sufficiently accurate numerical precision. Interchanging these operations may result in reduced hardware depending upon the exact method used for implementing each operation (e.g. FFT matched filter vs. tapped delay line sum network).

In yet one further embodiment, the squaring operation 206 and 214 may be replaced by a square-root operation or another non-linear detection operation that removes the signal phase from the accumulated signal transmitted to this circuit.

Reduced Complexity Matched Filter

In the foregoing discussion, the matched filter 408 continuously computed each of the sample values corresponding to all PN chips of a GPS frame (1023 chips, typically 2046 sample values at 2 samples per chip). It is possible, however, to reduce the matched filter complexity and still maintain the benefits of the present invention.

One method of reducing the complexity of the matched filter section is to utilize a matched filter that continuously provides an output, but whose length (i.e. impulse response duration) is less than the entire PN sequence. According to one embodiment, the matched filter 408 of FIG. 6A is structurally simplified. For example, Shift register 614 could utilize only 127 registers instead of the full 2045 registers, and weight structure 612 could utilize 64 weights instead of the full 1023 weights. This results in a reduction of complexity of matched filter 408 by a factor of 16. In this embodiment, the adder tree 610 is also be reduced to match the reduced scale of the shift register and weight structures.

The matched filter according to this reduced structural complexity method results in reduced system sensitivity since the total integration time per output data word is less than a full PN frame. However, it is guaranteed to produce a peak once every PN frame, and also features superior acquisition speed over alternative methods. It should be noted that scale reductions of the shift register, weight structure, and adder tree in matched filter 408, other than those explicitly noted are possible, and would yield proportionately altered performance characteristics.

Figure 6B:
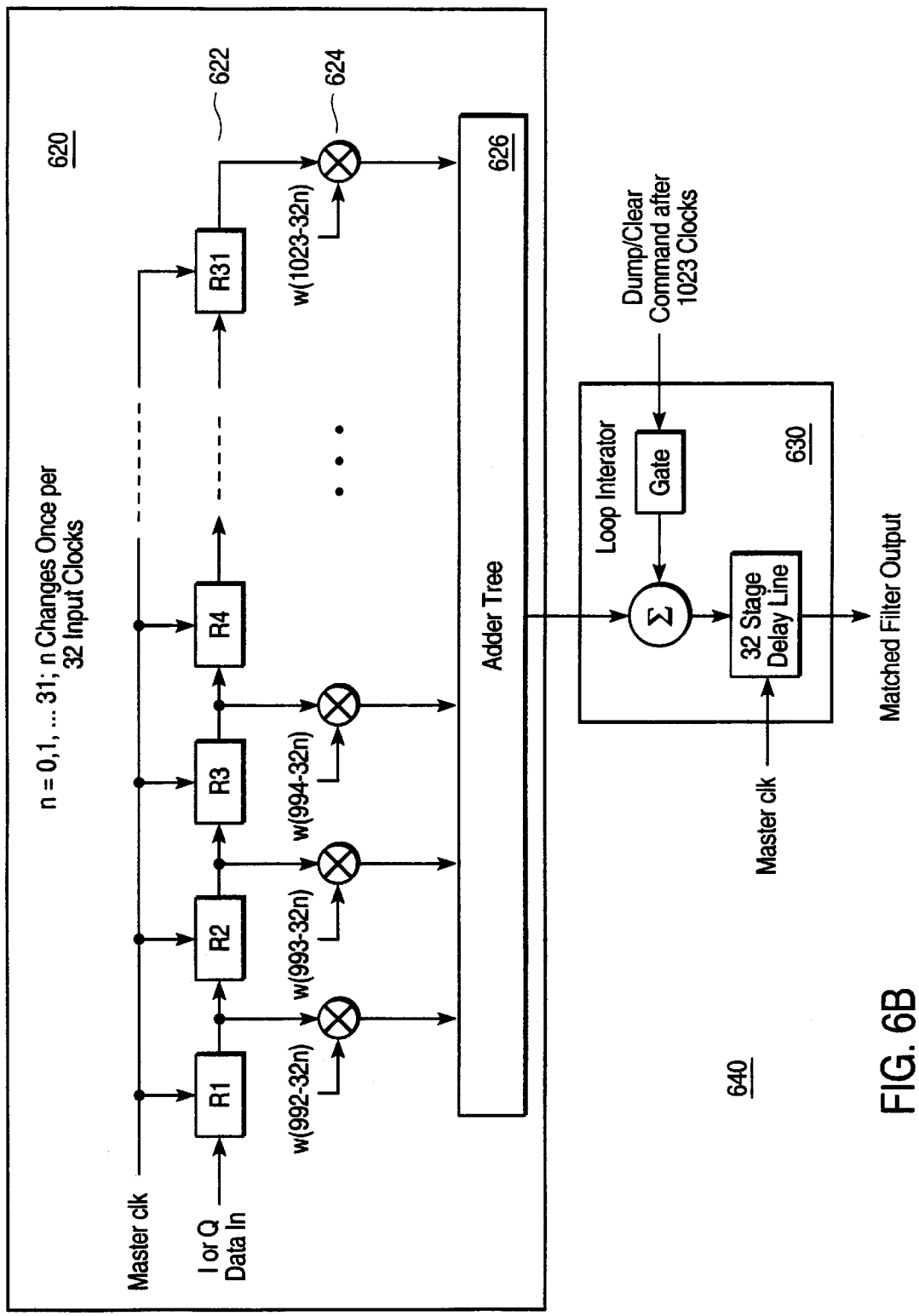
FIG. 6B is a block diagram representation of a matched filter utilized by acquisition circuit of FIG. 4, according to an alternative embodiment of the present invention in which a subset of possible outputs per PN frame is produced.

FIG. 6B illustrates a reduced complexity matched filter according to an alternative embodiment of the present invention. Matched filter system 640 produces a fraction of the possible outputs per PN frame, but has the matched filter length effectively the same as the PN frame length. For example, this would correspond to constructing a filter that produces an output for each of 64 consecutive clocks out of 2046 per PN frame. Each output would represent a potential pseudorange.

Matched filter 620 has the same sensitivity as normal matched filter 408, with length equal to the PN frame length; however, since it only produces a fraction of the full number of outputs per frame, its probability of producing a peak per each frame is the ratio of the number of outputs produced divided by the PN frame length. Thus, to achieve 100% probability of acquisition, the output produced would have to be "stepped" across the full range of time offsets corresponding to one PN frame. For example, for the example cited above, where 64 outputs are provided out of a total of 2046 clocks per PN frame, there are 2046/64 or 32 steps required to cover the full PN range. The matched filter according to this alternative embodiment is superior in sensitivity to the previously disclosed reduced complexity matched filter methods.

Matched filter system 640 contains matched filter 620 which produces a subset of possible outputs per PN frame. In particular, the illustrated structure produces 32 outputs per PN frame of length 1023. To clarify the following discussion it is presumed that the sample rate is one sample per chip, i.e., 1.023 Msamples/sec (for C/A codes using standard positioning service GPS). For further clarity, FIG. 6B illustrates a single matched filter 620 that can process 32 data samples at a time. This filter can be augmented with a loop integrator 630 to construct a filter with greater length, and in particular one of length 1023.

In the following discussion, reference is made to FIG. 6B in which the shift register 622 elements and weight structure 624 are assigned specific but exemplary values at a particular time. At time 0 (t=0), the data samples in the registers R1 to R32 are, respectively x(32), x(31), ..., x(1), where x(1) represents a first input data sample in time, x(2) a second and so on. At t=0, the filter structure 620 produces the result x(1)w1023+x(2)w(1022)+ ... +x(31)w(992). Similarly at times t=1 through t=31, the filter weights 624 remain the same, but the data is shifted one position and a similar computation occurs. The following data is then output from the matched filter and stored in the loop integrator 630 for the first 32 clock cycles (each line represents one successive output data sample):

Block 1 Matched Filter Computation $x(1)w(1023) + x(2)w(1022) + \ldots + x(32)w(992)$ $x(2)w(1023) + x(3)w(1022) + \ldots + x(33)w(992)$ $\vdots$ $x(32)w(1023) + x(33)w(1022) + \ldots + x(63)w(992)$ At this time, after 32 samples have been processed, the weights are replaced with weights with indices 32 less then their original value (i.e., w(991) ... ,w(960)) and the matched filter produces the results for the next 32 samples (times t=32 to t=63):

Block 2 Matched Filter Computation $x(33)w(991) + x(34)w(990) + \ldots + x(64)w(960)$ $x(34)w(991) + x(35)w(1022) + \ldots + x(65)w(960)$ $\vdots$ $x(64)w(991) + x(65)w(990) + \ldots + x(95)w(960)$ The effect of the loop integrator 630, however, is to add together the corresponding rows of the above two arrays, thereby yielding, within its storage registers, the overall result for each of the times t=32 to t=63:

Block 2 Loop Integrator Output $x(1)w(1023) + x(2)w(1022) + \ldots + x(64)w(960)$ $x(2)w(1023) + x(3)w(1022) + \ldots + x(65)w(960)$ $\vdots$ $x(32)w(1023) + x(33)w(1022) + \ldots + x(95)w(960)$ Each row of this latter array is identical to that produced for a length 64 matched filter, corresponding to output time t=0, 1, ..., 31. Hence, the loop filter implements the required functions to allow the matched filter to act as a longer length matched filter. Similarly, after every additional 32 samples a new set of weights is introduced with indices of values 32 less than the previous set. The above analysis applies, and the outputs of the loop integrator after every additional 32 samples represents the filter outputs at times t=0 through t=31 that would result for ever longer matched filters. After 32 such periods, the set of data produced by the matched filter 620 is:

Block 32 Matched Filter Computation $x(993)w(31) + x(994)w(30) + \ldots + x(1024)w(0)$ $x(994)w(31) + x(995)w(30) + \ldots + x(1025)w(0)$ $\vdots$ $x(1024)w(31) + x(1025)w(30) + \ldots + x(1055)w(0)$ This data is added to the previous data to complete the operation. Each time loop integrator 630 is updated in this final block, its contents can be sent to another buffer. The next time loop integrator 630 is updated, its initial state can be set to zero, unless one desires to integrate over several frames.

One drawback associated with method of the above example is that there is no weight of size w(0) since there are only 1023 weights per PN frame (if the sample rate is commensurate with the PN length). However, if w(0) is set to w(1023), a proper filter length of 1024, is effectively produced. This approach takes advantage of the periodicity of the PN signal.

A second drawback associated with the method of the above example is that the last row of Block 32 begins with x(1024). It would be advantageous, however, if this word were the first word of Block 1 for the next PN frame, so that the same set of matched filter outputs are computed for each frame, modulo the frame length 1023. The problem here is that 32 does not divide evenly into 1023. This peak alignment problem can be solved by preventing the matched filter from computing the last row of Block 32 and adding it to loop integrator 630. This effectively of makes the 32nd quantity within the loop erroneous, and hence only 31 consecutive matched filter outputs would be valid. In matched filter 620, weights w(1023), w(1022)+ . . . +w(992) would simply be loaded into weight structure 624 at the 31st cycles following the beginning of Block 32 rather than at cycle 32. Furthermore, the loop integrator counter would be reset at this time as well. An alternative correction is to use a matched filter of length 31 or 33, either of which divide evenly into 1023.

Several variations are possible with regard to the reduced matched filter structure 640 of FIG. 6B. First, matched filter 620 could be implemented by circuit 800 of FIG. 8, which utilizes only a single multiplier/accumulator. Furthermore, the filter weights may be provided via a shift register. In this case, the order of operations required by the above method would be consistent with simply providing the weights in the sequential order w(1023), w(1022), . . . . ,w(1).

It is also possible to combine two or more filter/accumulators of FIG. 7 with the accumulator of FIG. 6B to construct a matched filter of a longer length (e.g., 64 or 128). In fact, almost any matched filter structure can be used in place of the straightforward tapped delay line structure 622 of matched filter 620. It is, of course, possible to compute a non-contiguous set of outputs of the matched filter by several means. For example, the shift register 620 of matched filter 620 could be shifted four times per each matched filter calculation to provide every fourth matched filter output.

GPS Receiver

Figure 9:
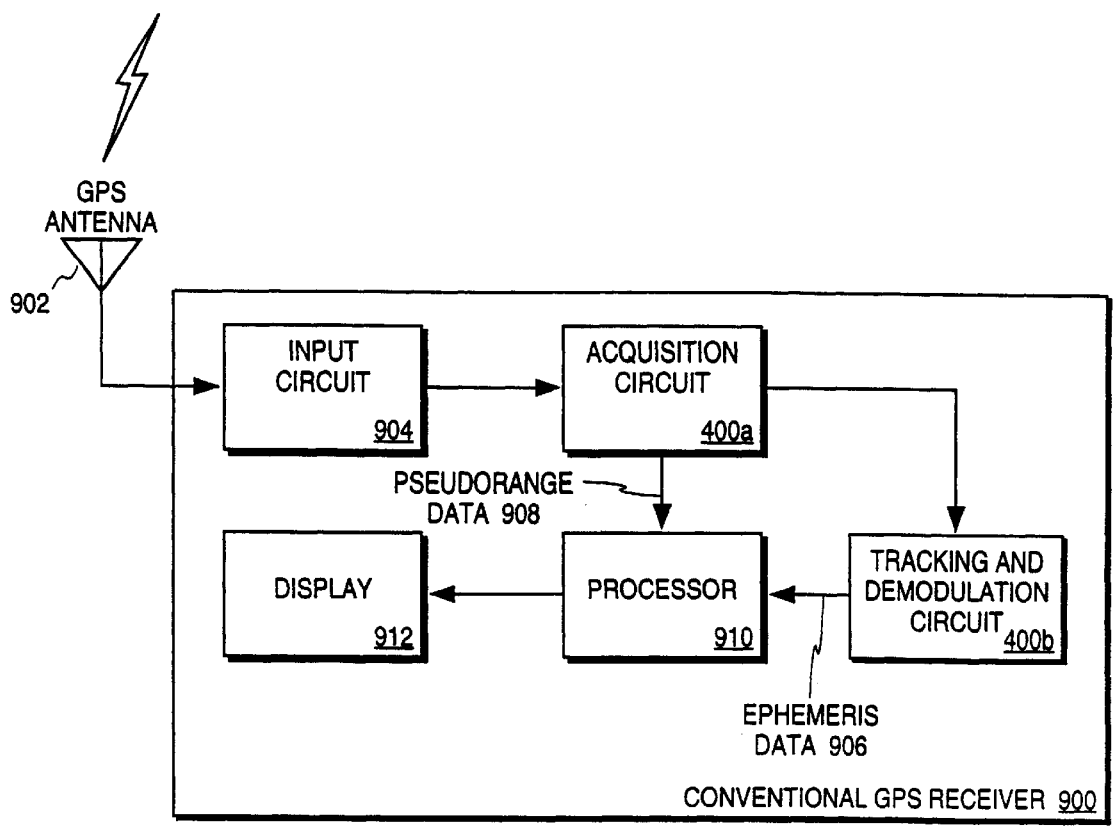
FIG. 9 is a block diagram representation of a global positioning system which implements the acquisition and tracking operations according to one embodiment of the present invention.

FIG. 9 illustrates the implementation of acquisition circuit 400 in a conventional GPS receiver 900 according to one embodiment of the present invention. GPS signals are received by GPS antenna 902 and input to GPS receiver 900 through input circuit 904. The PN codes within the received GPS signals are acquired and tracked in circuit 400a together with an external processor 910 in accordance with the operation described above with respect to FIGS. 4–8. The output of acquisition 400a comprises the pseudorange data 908 corresponding to the signals received from each GPS satellite from which a signal was received. Each satellite also transmits ephemeris data which is received by input circuit 904 and demodulated by circuit 400b. Processor 910 processes the ephemeris and pseudorange data to determines the location of the receiver. The output of processor 910 drives an input/output device such as display device 912 which graphically or textually displays the location of the unit. In this configuration, the circuit of FIG. 4 performs both the acquisition and tracking functions together with processor 910.

Figure 10:
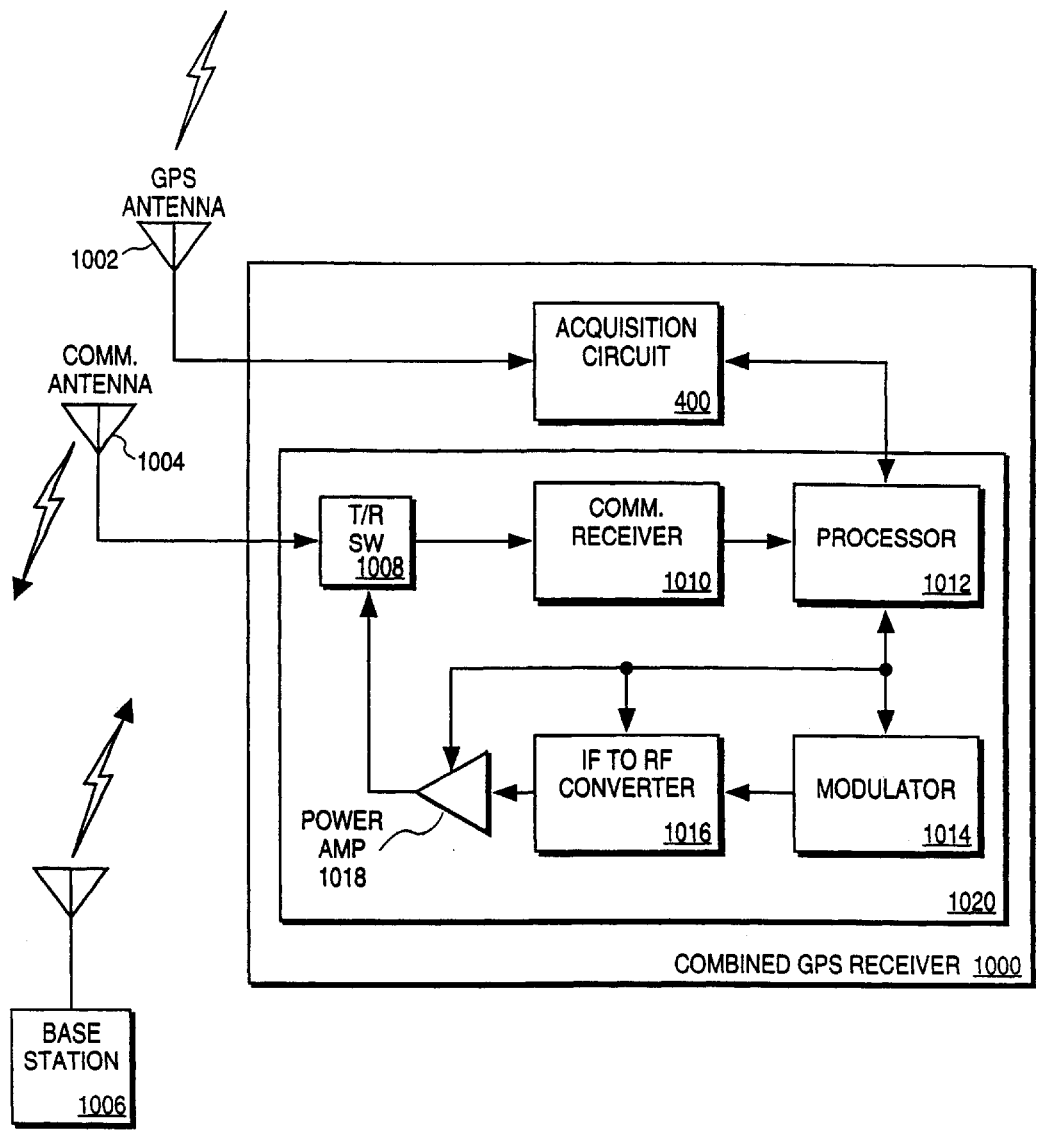
FIG. 10 shows a block diagram of a remote global positioning system which implements an acquisition circuit according to an alternative embodiment of the present invention.

FIG. 10 illustrates the implementation of acquisition circuit in a GPS receiver 1000 according to an alternative embodiment of the present invention. GPS receiver 1000 is a combined GPS and communication receiver transmitter. Receiver 1000 contains a GPS receiver stage including acquisition circuit 400 and communication transceiver section 1020. GPS signals are received through GPS antenna 1002 and input to acquisition circuit 400 which acquires the PN codes for the various received satellites. The pseudorange data produced by acquisition circuit 400 are processed by processor 1012 for transmittal by transceiver 1020. Transceiver 1020 contains a transmit/receive switch (or duplexer) 1008 which routes communication signals (typically RF) to and from communication antenna 1004 and receiver 1000. Received communication signals are input to communication receiver 1010 and passed to processor 1012 for processing. Communication signals to be transmitted from processor 1012 are propagated to modulator 1014 and frequency converter 1016. Power amp 1018 increases the gain of the signal to an appropriate level for transmission to base station 1006. In the combined GPS/communication system of receiver 1000, pseudorange data generated by acquisition circuit 400 is transmitted over a communication link to base station 1006. Base station 1006 then determines the location of receiver 1000 based on the pseudorange data from the remote receiver and ephemeris data received from its own GPS receiver or other sources of such data. The location data can then be transmitted back to GPS receiver 1000 or to other remote locations. The communication link between receiver 1000 and base station 1006 may be implemented in a number of various embodiments including a direct link or cellular phone link.

Method for Reducing Register Count

The previously described examples of GPS acquisition circuits all implemented multiple matched filters in parallel with each requiring a separate shift register to store the incoming data (e.g., acquisition circuit 200 of FIG. 2). For these circuits, if a large number of channels are implemented in parallel, for example eight, then the number of registers becomes large and may dominate the overall gate count of the system. Furthermore, there may be an appreciable power drain associated with this large number of registers. In one embodiment of the present invention, the GPS acquisition circuit to hold the input GPS signal data utilizes a single shift register at the input stage.

The reason why multiple matched filter channels traditionally need multiple shift registers is that the requirement to perform Doppler carrier correction and Doppler time correction (i.e., sample clock variation) varies from one channel to the next. Hence, if the Doppler carrier correction is performed on the incoming data, N new data streams corresponding to N different Dopplers for N channels are produced. Similarly, in order to track the signal's changing chip rate, the clock fed to the shift register holding the data is altered in accordance with that required by the Doppler associated with the particularly channel. This again has traditionally implied that separate shift registers be used to hold the data for each channel.

One embodiment of the present invention compensates for a changing carrier by altering the matched filter weights on a regular basis (for example, once per PN frame, or once per millisecond), together with the application of carrier correction after the matched filter. This embodiment, therefore, eliminates the requirement of using separate shift registers. The method of changing the effective sampling time is again to change the weights of the matched filter on a regular basis together with providing a resampling of the data signal after the matched filter operation.

Figure 11:
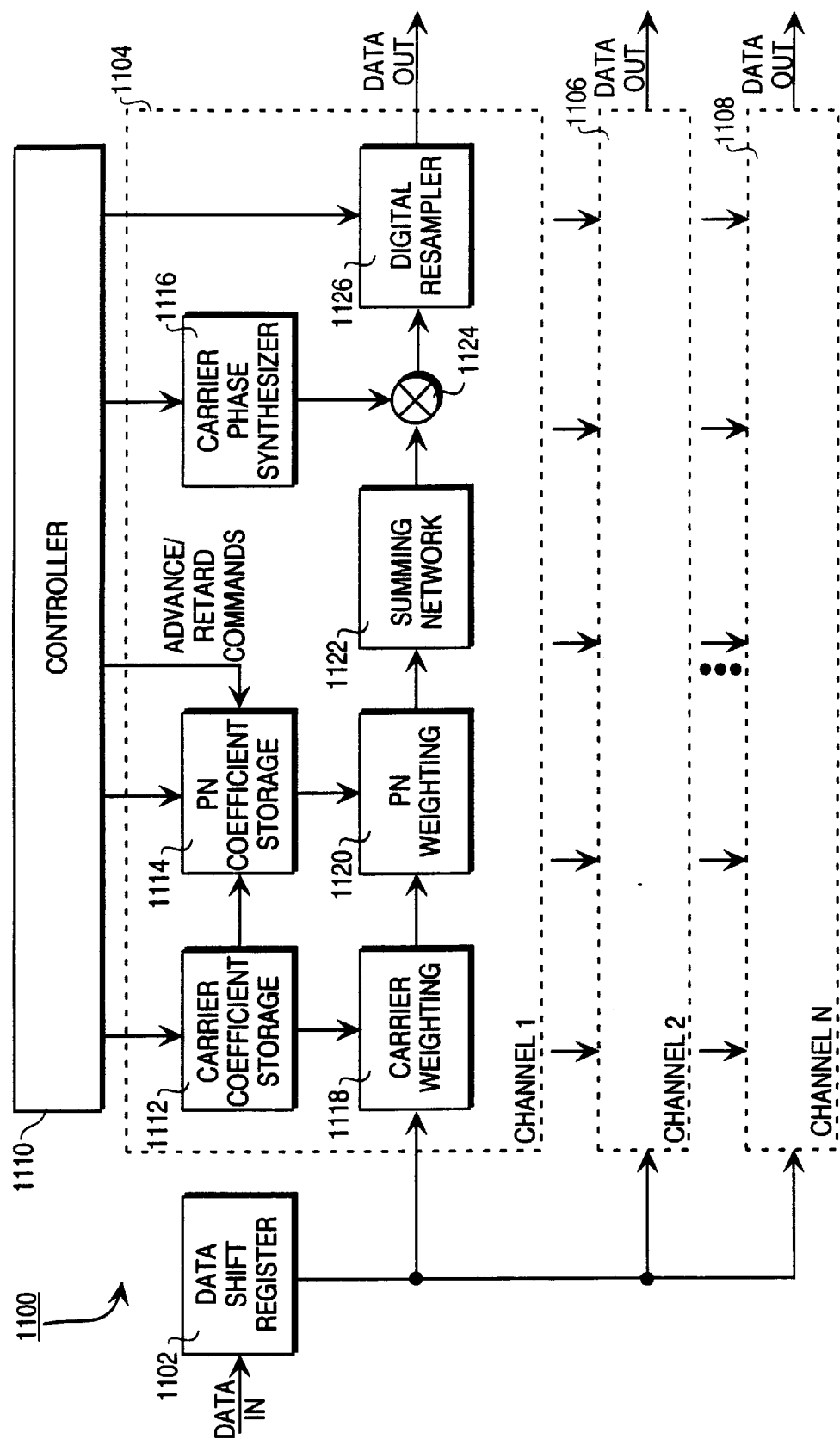
FIG. 11 is a block diagram representation of a global positioning system acquisition circuit featuring a reduced register count, according to one embodiment of the present invention.

FIG. 11 is a block diagram illustration of a reduced register GPS acquisition circuit according to one embodiment of the present invention. In circuit 1100, input data is fed to a single data shift register 1102. The size of the input shift register is typically of length 1023 or 2046 depending upon the number of samples per chip. The output of shift register 1102 is fed in parallel to N matched filter channels, 1104, 1106, up through 1108. The circuits comprising the first matched filter channel 1104 is illustrated in detail; however, it is to be understood that the N matched filter channels contain identical circuitry. Each channel includes storage for carrier coefficient values 1112, and storage for PN coefficient values 1114. The carrier coefficients are input into a carrier weighting circuit 1118. Likewise, the PN coefficients are input into a PN weighting circuit 1120. The weighted carrier and PN coefficients are then combined in summing network 1122.

The data from shift register 1102 is thus propagated through N matched filter networks, each of which combines weighting for both the PN and frequency coefficients. The purpose of this arrangement is that if a single PN frame of the input signal were the form $s(t)=P(t-d)\exp(j2\pi ft)$, where $P(t)$ is the PN sequence of length 1023 chips, f is the residual Doppler frequency and d is a relative delay, then a filter matched to this signal would have impulse response identical to $s(t)$ except flipped in time. This weighting function can be split into two parts, one corresponding to the PN sequence $P(t-d)$ and the other corresponding to the carrier weighting function $\exp(j2\pi ft)$, with t ranging from 0 to filter impulse response length (typically one millisecond). Since f and d vary from channel to channel, and also vary slowly with respect to time, these weighting functions must be regularly updated. In most cases an updating once per millisecond (PN frame) is more than adequate since there is very little change in carrier frequency (typically less than 1 Hz) and very little change in PN phase (less than 0.003 chips) in a one millisecond period.

Figure 12:
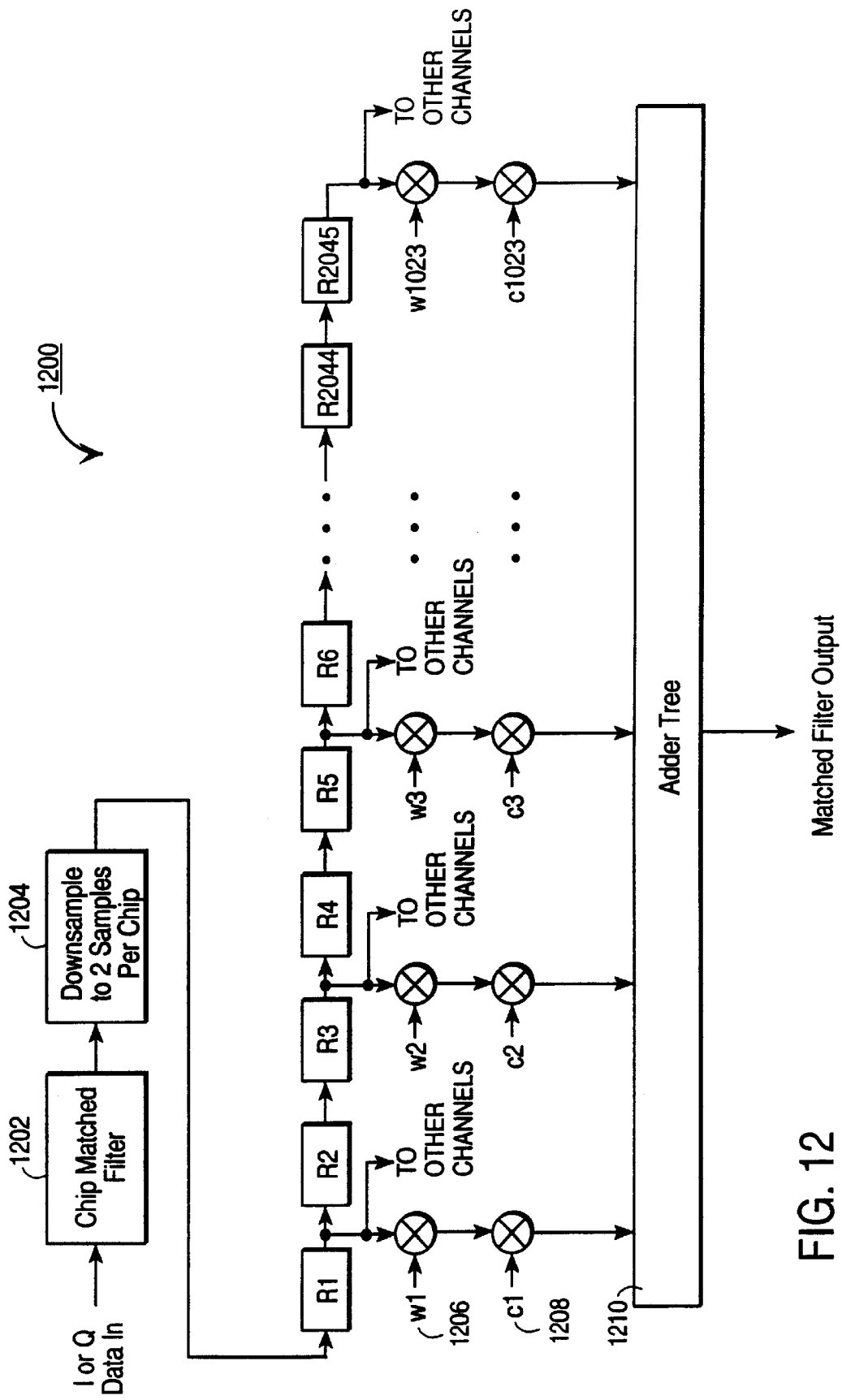
FIG. 12 is a block diagram representation of a matched filter utilized by acquisition circuit of FIG. 11, according to one embodiment of the present invention.

The operation of carrier weighting circuit 1118 and PN weighting circuit 1120 are illustrated in greater detail in FIG. 12. The combined "w" and "c" filter coefficients used in FIGS. 11 and 12 correspond to a filter transfer function not at baseband but at frequency f. Hence, the data emanating from the matched filter is not at baseband either. Thus, if 10 successive PN frames from the matched filter (e.g., the delay-line integrators of FIG. 4) are to be coherently add together, the carrier frequency of the signal exiting the matched filter must be compensated so that the phases line up from one frame to the next. This compensation is performed by the multiplier 1124 at the output of channel 1 of FIG. 11. In the most general form, the local oscillator 1116 feeding multiplier 1124 is simply $\exp(-j2\pi ft)$, where f is the Doppler to be corrected and t is a continuously increasing time. This then down converts the signal at the filter output to 0 frequency and allows frame by frame integration.

For the purposes of coherent frame to frame addition it is not necessary to continuously run the carrier phase synthesizer 1116 of circuit 1100, but instead one phase can be used for an entire frame. The phase then must be incremented for the next frame by an amount of the accumulated Doppler phase per frame, namely $2\pi fT_f$, where $T_f$ is the frame duration (one millisecond). This approach reduces the speed of operation of the carrier phase synthesizer 1116. It should be noted that adjacent samples output from the matched filter following this frequency conversion will, in this case, have slightly different phases, namely $2\pi fT_c$ where $T_c$ is the chip duration. Normally, the small Doppler errors associated with GPS satellites (typically less than 3500 Hz) result in this phase difference being inconsequential (less than 1 degree).

The output of the carrier phase synthesizer 1116 is fed to a digital resampler circuit 1126. This circuit acts as a variable delay line which can delay the input signal over a range of ±½ sample. This may be done in the simplest manner by a linear interpolator which simply weights two adjacent samples in proportion to the time differences of the desired sampling time relative to the times of the nearest two sample times on either side of it. Linear interpolation results in a rolloff of the signal spectrum; however, this can be compensated by an equalizing filter placed prior to the matched filter, for example as part of the chip matched filter 1202 of FIG. 12. When a delay in excess of ½ sample is required, this is accomplished by simply circularly shifting the PN coefficients stored in the storage unit 1114 (forward or backwards) via "advance/retard commands," as shown in FIG. 11, and then adjusting the fine interpolation of the resampler circuit. Updating the PN coefficients in this manner is a relatively infrequent operation, required less than three times per second, due to the relative small time Doppler associated with GPS satellites (typically less than 2700 nsec/sec). The control of all the above operations may be performed in circuit 1100 by a conventional microcontroller or microprocessor 1110.

FIG. 12 illustrates an example of how the separate weighting of the PN and carrier frequency may be performed by an embodiment of the present invention. Matched filter 1200 utilizes a weighted tapped delay line structure. In-phase or quadrature data input is input into chip matched filter 1202 that is matched to the time waveform of an individual chip. The output from chip matched filter 1202 is then down sampled to two samples per chip in downsampler 1204. The downsampled signal is then fed into a tapped delay line filter which is matched to the actual pattern of the pseudorandom signal pattern. The "w" coefficients 1206 tapped filter are those corresponding to the PN coefficients and the "c" coefficients 1208 are those corresponding to the carrier frequency. The outputs from the weighted signals are then combined in adder tree 1210 produce the output from matched filter 1200. The circuit of FIG. 12 represents a modification of the straightforward embodiment illustrated in FIG. 6A. However, the weighting approach of circuit 1200 may be similarly used in the various efficient matched filter structures discussed herein, such as those in FIGS. 6B, 7, and 8.

As can be seen, it is possible to combine the weights of FIG. 12, that is, the w and c weights may be combined to produce weights $d1=w1\times c1$, $d2=w2\times c2$, and so on. Such a combination would avoid two multiplication operations. However, the arrangement illustrated in circuit 1200 has some benefits over this approach. First, in many cases the PN coefficients w are entirely real, i.e., they do not have a quadrature component. Thus, in FIG. 12, the w coefficients only require 1023 words of storage and 1023 multiplies per output in-phase or quadrature point. The frequency coefficients c, being complex, have both an in-phase and quadrature component. Thus, they may require as many as 2046 words of storage and also require 4092 multiplies and 2048 adds per output in-phase or quadrature point. This large amount of frequency coefficient storage can be dramatically reduced if a number of successive values of the c coefficients are taken to be identical, for example 16.

This may be done in many cases since the Doppler corrections are normally very small, on the order of several kHz and the effective spacing between samples weighted by the successive coefficients is around 1 MHz. Thus, successive frequency coefficients correspond to a phase change on the order of 0.003 maximum, or about 1 degree in phase. If 16 frequency coefficients in a row were identical, then the maximum phase error for this case would be about 8 degrees, which results in a loss in signal energy by less than 0.09 dB.

In most cases, the PN weights w need rarely be updated since the time Doppler for GPS does not exceed three chips per second. However, the carrier Doppler weights c need to be updated more often, perhaps on the order of 100 times per second since the Doppler can change on the order of 1 Hz per second. The updating process can result in some loss of signal energy since the weights are disturbed during this updating process (unless an expensive double buffer approach is used). Since there are many fewer Doppler weights than PN weights (assuming 16 Doppler weights in a row are identical), the duration of disturbance (i.e., the loading of new data into carrier coefficient storage 1112) is minimized by separating the weighting procedures as shown in FIG. 12.

In some GPS receivers, there are very large frequency and sampling rate errors due to a poorly controlled reference local oscillator. For example, if a 10 parts per million (PPM) crystal oscillator were used, then a frequency error of around 15750 Hz would be present for all the channels (ignoring the much smaller Doppler frequency errors), and similarly a sampling time error of 10 microseconds per second would result. While circuits 1100 and 1200 of FIGS. 11 and 12 respectively, may accommodate such large errors, it can be deduced from the preceding discussion that such large frequency errors may have negative impact upon system performance and/or complexity. This is especially the case where it is desired to have a number of successive frequency weights be identical. A large frequency error of this sort that is common to all channels (i.e. is common mode) may be easily compensated by using a single digital frequency conversion circuit prior to the matched filters of FIG. 11 (e.g., before the data shift register or just after it). This eliminates the need for the succeeding circuits to compensate for such large errors. The sampling time error is still relatively small so it need not be separately compensated in a similar manner.

Although the methods and apparatus of the present invention have been described with reference to GPS satellites, it will be appreciated that the teachings are equally applicable to positioning systems which utilize pseudolites or a combination of satellites and pseudolites. Pseudolites are ground based transmitters which broadcast a PN code (similar to a GPS signal) modulated on an L-band carrier signal, generally synchronized with GPS time. Each transmitter may be assigned a unique PN code so as to permit identification by a remote receiver. Pseudolites are useful in situations where GPS signals from an orbiting satellite might by unavailable, such as tunnels, mines, buildings or other enclosed areas. The term "satellite", as used herein, is intended to include pseudolites or equivalents of pseudolites, and the term GPS signals, as used herein, is intended to include GPS-like signals from pseudolites or equivalents of pseudolites.

In the preceding discussion the invention has been described with reference to application upon the United States Global Positioning Satellite (GPS) system. It should be evident, however, that these methods are equally applicable to similar satellite positioning systems, such as the Russian Glonass system. The term "GPS" used herein includes such alternative satellite positioning systems, including the Russian Glonass system. The term "GPS signals" includes signals from alternative satellite positioning systems.

In the foregoing, a system has been described for receiving GPS signals through a fast acquisition, high sensitivity acquisition circuit. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than restrictive sense.

What is claimed is:

1. A matched filter circuit comprising:
an input operable to receive a sample of GPS (global positioning system) signals;
a data shift register with a plurality of tapped delay outputs, said data shift register coupled to said input; and
a plurality of matched filter channels, each coupled to said plurality of tapped delay outputs of said data shift register, wherein each matched filter channel performs a separate matched filtering operation on said sample of GPS signals and each matched filter channel provides a separate output, and
wherein each matched filter channel further comprises a matched filter network operable to provide as matched filter weights, a first series of weighted coefficients corresponding to a pseudorandom sequence and a second series of weighted coefficients corresponding to a carrier frequency sequence.

2. A matched filter circuit as in claim 1 wherein the length of said data shift register corresponds to the maximum length of parallel data inputs to said plurality of matched filter channels.

3. A matched filter circuit as in claim 1 wherein the length of distinct coefficients of said second series of weighted coefficients is less than that of said first series of weighted coefficients.

4. A matched filter circuit as in claim 1 wherein each matched filter channel of said plurality of matched filter channels further comprises:
a first circuit operable to alter one or more weighted coefficients of said first series of weighted coefficients over a period of time; and
a second circuit operable to apply a time correction to said sample of GPS signals subsequent to said matched filtering operation.

5. A matched filter circuit as in claim 4 wherein each matched filter channel of said plurality of matched filter channels further comprises:
a third circuit operable to alter one or more weighted coefficients of said second series of weighted coefficients over a period of time; and
a fourth circuit operable to apply a carrier correction to said sample of GPS signals subsequent to said matched filtering operation.

6. A matched filter circuit as in claim 1 wherein each matched filter channel of said plurality of matched filter channels further comprises:
a first circuit operable to alter one or more weighted coefficients of said second series of weighted coefficients over a period of time; and
a second circuit operable to apply a carrier correction to said sample of GPS signals subsequent to said matched filtering operation.

7. The circuit of claim 1 wherein at any instance of time said tapped delay outputs of said data shift register hold data words separated in time by one chip interval of said global positioning system signals.

8. The circuit of claim 7 further comprising a filter coupled to an input of said data shift register that is matched to a waveform of an individual chip of said global positioning system signals.

9. The circuit of claim 1, wherein said data shift register is a multiple bit shift register, capable of shifting in parallel all bits associated with data words represented in a multiple bit arithmetic format.

10. A method of acquiring and tracking global positioning system signals, said method comprising:
receiving a sample of global positioning system signals;
providing said sample of global positioning system (GPS) signals to a plurality of matched filter channels through a plurality of tapped delay outputs of a shift register;
providing as matched filter weights, in each matched filter channel of said plurality of matched filter channels, a first series of weighted coefficients corresponding to a pseudorandom sequence and a second series of weighted coefficients corresponding to a carrier frequency sequence.

11. A method as in claim 10 wherein the length of said shift register corresponds to the maximum length of parallel data inputs to said plurality of matched filters.

12. A method as in claim 10 further comprising:
altering one or more weighted coefficients of said first series of weighted coefficients over a period of time; and
applying a time correction to said sample of GPS signals, subsequent to said providing of said sample of GPS signals, in at least one matched filter channel of said plurality of matched filter channels.

13. A method as in claim 12 further comprising:
altering one or more weighted coefficients of said second series of weighted coefficients over a period of time; and
applying a carrier correction to said sample of GPS signals, subsequent to said providing of said sample of GPS signals, in at least one matched filter channel of said plurality of matched filter channels.

14. A method as in claim 10 further comprising:
altering one or more weighted coefficients of said second series of weighted coefficients over a period of time; and
applying a carrier correction to said sample of GPS signals, subsequent to said providing of said sample of GPS signals, in at least one matched filter channel of said plurality of matched filter channels.

15. A method of acquiring and tracking global positioning system signals, said method comprising:
performing a pseudo-random noise matched filter operation on a current set of samples of global positioning system (GPS) signals to provide a current matched filter output block of data;
linearly combining with said current matched filter output block of data a first set of at least one prior matched filter output block of data to produce a first linearly combined output block of data, wherein the beginning each block of said first set occurs at a time relative to said current matched filter output block equal to a multiple of a frame duration of said global positioning system signals;
performing a nonlinear operation on said linearly combined output block of data to provide a first detected block of data;
performing a pseudo-random noise matched filter operation on a set of samples of global positioning system signals subsequent to said current set of samples to provide a subsequent matched filter output block of data;
linearly combining with said subsequent matched filter output block of data a second set of at least one prior matched filter output block of data to produce a second linearly combined output block of data, wherein the beginning of each block of said second set occurs at a time relative to said subsequent matched filter output block equal to a multiple of the frame duration of said global positioning system signals;
performing a nonlinear operation on said second linearly combined output block of data to provide a second detected block of data;
linearly combining said second detected block of data with said first detected block of data to provide a combined detected block; and
utilizing said combined detected block to determine a time-of-arrival estimate of at least one constituent signal of said global positioning system signals.

16. The method according to claim 15 wherein said current matched filter output block of data comprises at least a set of data occurring over an interval of time equal to a fraction of one frame period of said global positioning system signals, said fraction exceeding $1/256$.

17. The method according to claim 16 further comprising storing said first linearly combined output block of data in a predetermined set of locations.

18. The method according to claim 16 wherein said linearly combining said current matched filter output block of data with said first set of at least one prior matched filter output block of data comprises a linear scaling and summation operation.

19. The method according to claim 16 wherein said combining said second detected block of data with said first detected block of data is a linear scaling and summation operation.

20. The method according to claim 15 wherein said first detected block of data is shifted in time with respect to said second detected block of data by an amount that is a multiple of the frame duration of said global positioning system signals.

21. The method according to claim 15 wherein said nonlinear operation is one of a magnitude-square operation or an envelope operation.

22. The method of claim 15 wherein said matched filter operation on said current set of samples of GPS signals further comprises a plurality of matched filter sub-operations, each of said sub-operations performed by a separate unit, and wherein the outputs of said units are further combined to produce the current matched filter output block of data.

23. The method of claim 22 wherein said sub-operations are performed on subsets of data and filter weights, and said sub-operations are identical except for the data and filter weights upon which each of said plurality of matched filter sub-operations are performed.

24. The method of claim 22 wherein each of said plurality of matched filter sub-operations utilizes a single weighting and accumulation unit.

25. The method of claim 15 wherein said matched filter operation on said current set of samples of GPS signals utilizes a matched filter whose response is matched to a portion of a full pseudorandom frame.

26. The method of claim 15 wherein said matched filter operation on said current set of samples of GPS signals utilizes a matched filter which is matched to a full pseudorandom frame, and which provides as an output a number of words less than that corresponding to a full frame length of said global positioning system signals.

27. The method of claim 15 wherein said matched filter operation on said current set of samples of GPS signals utilizes a matched filter which is matched to a portion of a full pseudorandom frame, and which provides as an output a number of words less than that corresponding to a full frame length of said global positioning system signals.

28. A circuit for acquiring and tracking global positioning system signals received in a global positioning system receiver, said acquisition circuit comprising:
an input signal port for receiving global positioning system signals;
a matched filter coupled to said input signal port to produce a set of filtered data;
a first loop integrator coupled to said matched filter output, said first loop integrator having an output;

a nonlinearity operator coupled to said output of said first loop integrator, said nonlinearity operator having an output;

a second loop integrator coupled to the output of said nonlinearity operator, wherein said first loop integrator combines a first block of filtered data from said matched filter with a subsequent block of filtered data from said matched filter and wherein the beginning of said first block of data and the beginning of said subsequent block of data occur at times separated by a multiple of the frame duration of said global positioning system signals.

29. A circuit according to claim 28 further comprising:

a digital frequency translation circuit coupled to said input signal port;

a digital resampler circuit coupled to said digital frequency translation circuit;

a register bank coupled to said first loop integrator and said second loop integrator.

30. A circuit according to claim 29 wherein said circuit tracks at least one of the constituent signals of said received global positioning system signals.

31. A circuit according to claim 30 wherein at least one of said first loop integrator and said second loop integrator implement a feedback circuit of unity gain.

32. A circuit according to claim 29 wherein at least one of said first loop integrator and said second loop integrator implement a feedback circuit of less than unity gain.

33. The circuit of claim 29 wherein said register bank is implemented by a random access memory.

34. The circuit of claim 28 further comprising a third loop integrator coupled to said matched filter output and coupled to an input of said first loop integrator.

35. A system for receiving global positioning system signals comprising:

means for receiving a global positioning system signal;

means for performing a matched filter operation on said received global positioning system signal;

means for performing a first loop integration operation on an output of said matched filter;

means for performing a nonlinear operation upon an output signal of said first loop integration operation;

means for performing a second loop integration operation on the output of said nonlinear operation, wherein said first loop integrator combines a first block of filtered data with a subsequent block of filtered data and wherein the beginning of said first block of data and the beginning of said subsequent block of data occur at times separated by a multiple of the frame duration of said global positioning system signals.

36. A matched filter circuit comprising:

an input of said matched filter circuit operable to receive a sample of global positioning system signals;

a multiplexer having a first input coupled to said matched filter input and an output;

a shift register having an input directly connected to said multiplexer output;

a multiplier-accumulator combination coupled to a last output stage of said shift register; and a second input to said multiplexer directly connected to the last output stage of said shift register.

37. A matched filter circuit as in claim 36 wherein said matched filter circuit performs a matched filtering operation on said sample of global positioning system signals.

38. The circuit of claim 36, wherein said shift register is a multi-bit shift register, capable of shifting in parallel all bits associated with data words represented in a multiple bit arithmetic format.

* * * * *